(12) United States Patent
McCook et al.

(10) Patent No.: US 12,485,127 B2
(45) Date of Patent: Dec. 2, 2025

(54) COMPOSITIONS AND METHODS FOR TREATMENT AND PREVENTION OF ACTINIC KERATOSIS USING COPPER CHLORIN

(71) Applicant: CHL Industries, LLC, Austin, TX (US)

(72) Inventors: John P. McCook, Austin, TX (US); David B Vasily, Bethlehem, PA (US)

(73) Assignee: CHL Industries, LLC, Austin, TX (US)

( * ) Notice: Subject to any disclaimer, the term of this patent is extended or adjusted under 35 U.S.C. 154(b) by 0 days.

(21) Appl. No.: 18/948,977

(22) Filed: Nov. 15, 2024

(65) Prior Publication Data

US 2025/0295669 A1    Sep. 25, 2025

Related U.S. Application Data

(60) Provisional application No. 63/568,610, filed on Mar. 22, 2024, provisional application No. 63/569,009, filed on Mar. 22, 2024.

(51) Int. Cl.
*A61K 31/555*    (2006.01)
*A61P 17/00*    (2006.01)

(52) U.S. Cl.
CPC ............ *A61K 31/555* (2013.01); *A61P 17/00* (2018.01)

(58) Field of Classification Search
CPC .............................. A61K 31/555; A61P 17/00
See application file for complete search history.

(56) References Cited

U.S. PATENT DOCUMENTS

| | | | |
|---|---|---|---|
| 8,303,985 B2 * | 11/2012 | Dorogi | A61P 17/10 424/450 |
| 2005/0002979 A1 | 1/2005 | Glassman et al. | |
| 2007/0148222 A1 | 6/2007 | Dorogi et al. | |
| 2010/0255045 A1 | 10/2010 | Eymard Du Vernet | |
| 2012/0283235 A1 | 11/2012 | McCook et al. | |
| 2016/0113242 A1 | 4/2016 | Lacasse | |
| 2017/0231889 A1 | 8/2017 | Ehlis et al. | |
| 2019/0374573 A1 | 12/2019 | Modak et al. | |

OTHER PUBLICATIONS

Thompson et al., Reduction of Solar Keratoses by Regular Sunscreen Use, The New England Journal of Medicine, vol. 329, No. 16, pp. 1147-1151 (1993).*

Steeb, T., Wessely, A., Petzold, A., Schmitz, L., Dirschka, T., Berking, C., & Heppt, M. V. (2021). How to assess the efficacy of interventions for actinic keratosis? A review with a focus on long-term results. Journal of Clinical Medicine, 10(20), 4736.

Dianzani, C., Pierangeli, A., Chiricozzi, A., Avola, A., & Degener, A. M. (2008). Cutaneous human papillomaviruses as recurrence factor in actinic keratoses. International Journal of Immunopathology and Pharmacology, 21(1), 145-152.

Beadle, James R., et al., Antiviral Evaluation of Octadecyloyethyl Esters of (S)-3-Hydroxy-2-(phophonomethoxy) propyl Nucleosides Against Herpesviruses and Orthopoxviruses; NIH Public Access Author Manuscript; Antiviral Res. Dec. 2009; 84(3): 254-259; US.

Galati, Luisa, et al., Detection of human papillomaviruses in paired healthy skin and actinic keratosis by next generation sequencing; Papillomavirus Research 9 (2020) 100196; France; Italy.

Vasyuchenko, Ekaterina P. et al., CPE-DB: An Open Database of Chemical Penetration Enhancers; Pharmaceutics 2021, 13, 66. https://doi.org/10.3390/pharmaceutics 13010066; Russia.

Thompson, Sandra C. et al., Reduction of Solar Keratosis by Regular Sunscreen Use; The New England Journal of Medicine; vol. 329 No. 16, Massachusetts.

Tumolo, Tathyana, et al., Copper chlorophyllin: A food colorant with biactive properties?; 46 (2012) 451-459; Department of Food and Experimental Nutrition; Faculty of Pharmaceutical Sciences, University of Sao Paulo, Brazil.

Lee Ji Hyun, et al., Dermoscopic features of actinic keratosis and follow up with dermoscopy: A pilot study; The Journal of Dermatology; 2014; 41: 487-493; Korea.

* cited by examiner

*Primary Examiner* — Kevin E Weddington
(74) *Attorney, Agent, or Firm* — Scheef & Stone, LLP; Robin L. Barnes

(57) ABSTRACT

Treatment compositions and methods for treating and/or preventing actinic keratosis comprising applying a chlorin treatment composition in a topical form to one or more actinic keratosis lesions. A treatment composition preferably comprises a copper chlorin, such as a sodium copper chlorophyllin complex, trisodium copper chlorin p6, disodium copper isochlorin e4, or trisodium copper chlorin e6. A treatment composition comprises around 0.002% to around 0.1% by weight of copper chlorin. Treatments disclosed herein may result in elimination of the actinic keratosis lesions.

19 Claims, 5 Drawing Sheets

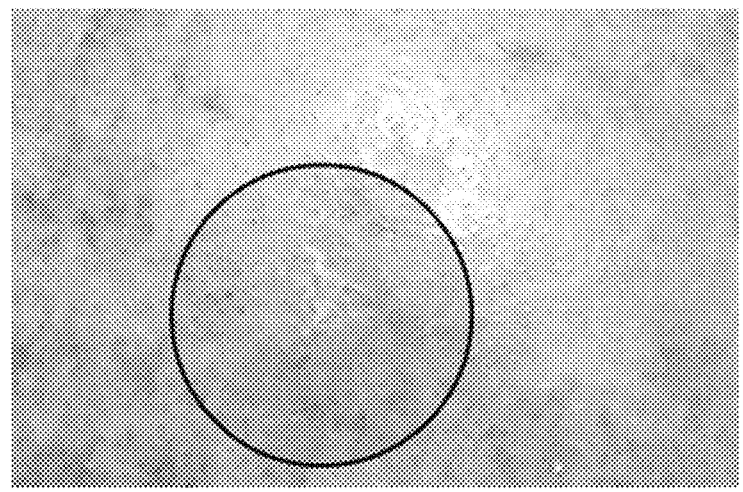
Fig 1a Photo: Baseline Patient AK001

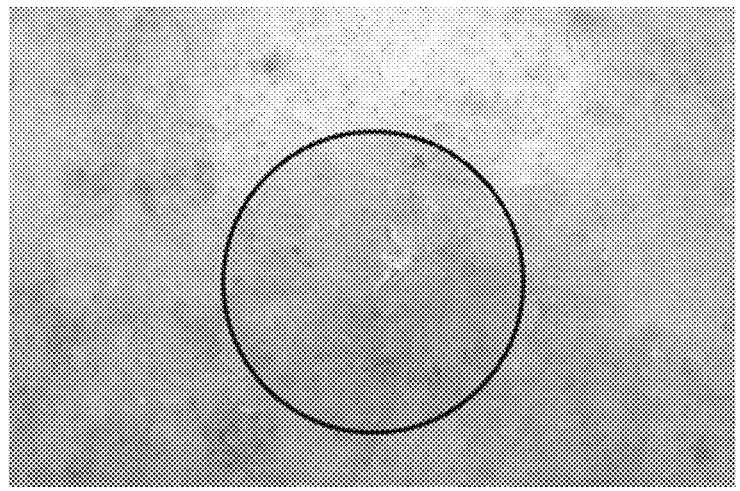
Fig 1b Photo: Patient AK002
After 11 days of daily Treatment with PB-01-068
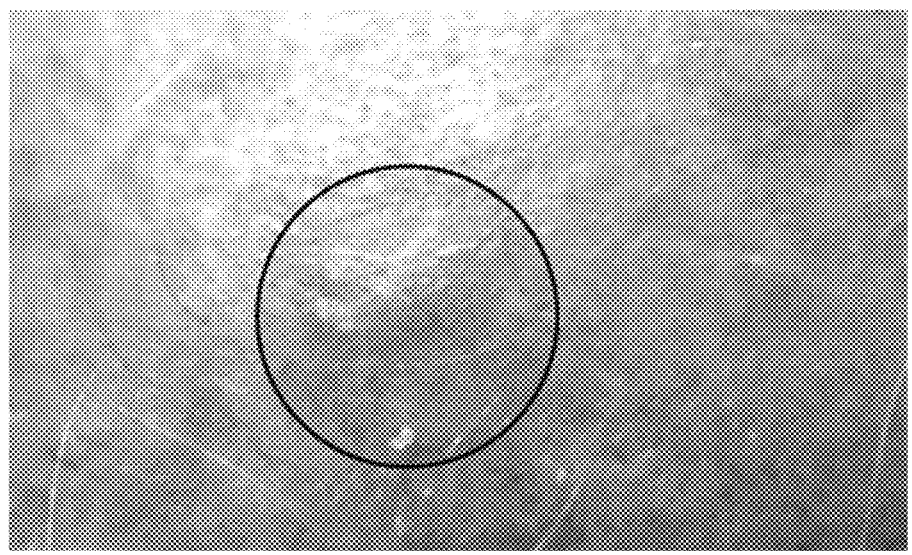
Fig 2a Photo: Baseline Patient AK002

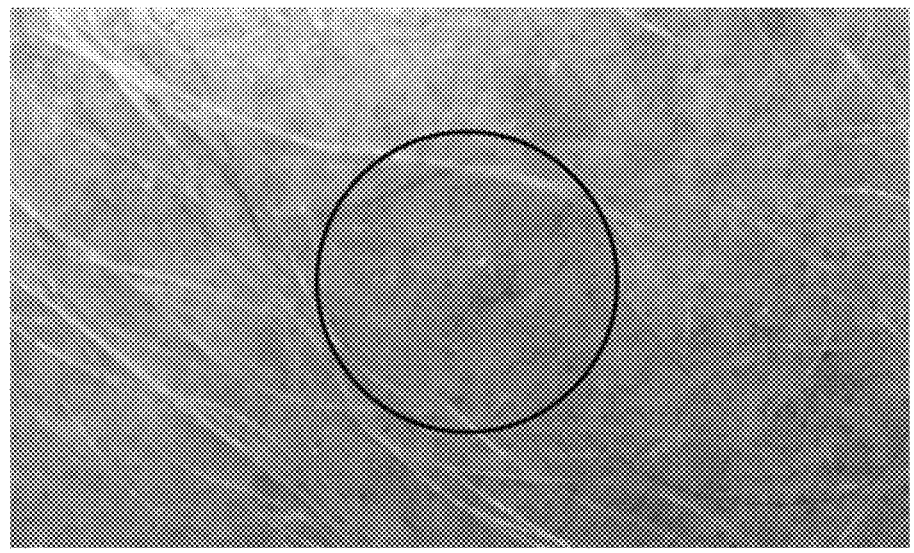
Fig 2b Photo: Patient AK002
After 11 days of daily Treatment with PB-01-073

COMPOSITIONS AND METHODS FOR TREATMENT AND PREVENTION OF ACTINIC KERATOSIS USING COPPER CHLORIN

CROSS REFERENCE TO RELATED APPLICATION

The application claims the benefit of U.S. Provisional Application No. 63/568,610 filed on Mar. 22, 2024 and U.S. Provisional Application No. 63/569,009 also filed on Mar. 22, 2024.

BACKGROUND OF THE DISCLOSURE

1. Field of the Disclosure

The present disclosure relates to compositions and methods for topical treatment and/or prevention of human or mammalian actinic keratosis, also known as solar keratosis, senile keratosis, or sun damage-related precancerous skin lesions, with compounds comprising chlorin compounds or complexes, particularly copper chlorin compounds or complexes.

2. Description of Related Technology

Actinic keratosis (AK or actinic keratoses or Aks: plural of AK), is a pre-cancerous area of thick, scaly, or crusty skin and is a disorder of epidermal keratinocytes that is induced by ultraviolet (UV) light exposure from solar radiation or UV skin tanning devices. The AK growths are more common in fair-skinned people and those who are frequently in the sun. They occur when skin gets damaged by UV radiation from the sun or indoor tanning beds, usually over the course of decades.

Actinic keratoses (multiple actinic keratosis lesions) characteristically appear as thick, scaly, or crusty areas that often feel dry or rough. The size commonly ranges between 2 and 6 millimeters, but they can grow to be several centimeters in diameter. Notably, AKs are often felt before they are seen, and the texture is sometimes compared to sandpaper. They may be dark, light, tan, pink, red, a combination of all these, or have the same color as the surrounding skin.

Given the causal relationship between sun exposure and AK growth, they often appear on a background of sun-damaged skin and in areas that are commonly sun-exposed, such as the face, ears, neck, scalp, chest, backs of hands, forearms, or lips. Typically, they occur as actinic keratoses or multiple Aks in chronically sun exposed areas of skin.

Actinic keratosis is the most common skin problem treated by Dermatologists and Primary Care Physicians in the United States, If left untreated, the risk of Aks developing into skin cancer, either squamous cell carcinoma or basal cell carcinoma, ranges between 4-10% with some reports indicating that up to 20% of untreated Aks evolving into Bowen's disease and squamous cell carcinoma.

Current first line treatments to eradicate or clear Aks vary based on whether the treatment is "lesion-directed", i.e., treatment is for a single or several Aks that can each be separately treated or removed with cryotherapy (e.g., liquid nitrogen), laser therapy, surgery, and curettage; or the treatment is "Field-directed", i.e., treatment is for relatively large areas of skin, particularly of the face and scalp that have many Aks and skin areas where multiple Aks have reoccurred after previous lesion directed AK treatment. Field-directed AK treatment usually involves the topical application of a drug product by each patient at home although photodynamic therapy (PDT, e.g., ALA-PDT) may also be used in the clinic by medical personnel instead of or in addition to topical drug product treatment. Commonly used topical drugs used in the field therapy treatment approach for Aks include 5-fluorouracil (5-FU), topical non-steroidal anti-inflammatory drugs (e.g., diclofenac, peroxicam) chemical peeling (trichloroacetic acid and various alpha- and beta-hydroxy acids), immunomodulators (e.g., imiquimod; ingenol mebutate), and turbanibulin, a newly approved topical for AK treatment.

Despite the wide range of available field and lesion-directed treatments for Aks, there is a need for new therapies that help solve the major drawbacks associated with the current state of the art: 1) incomplete clearance of AK lesions following therapy requiring multiple sequential treatments; 2) high AK recurrence rates following both field and lesion-directed therapies and 3) high incidence of treatment-related adverse reactions and side effects, particularly with field directed topical treatment.

One meta-analysis of AK clinical studies published in 2021 found that the recurrence rate for cryosurgery (cryotherapy; liquid nitrogen) and photodynamic therapy (ALA-PDT) were the lowest compared to field therapy treatments but still 39% after 12 months from initial treatments. They reported that topical field treatments were higher with the highest for diclofenac at 85% recurrence. This same publication reported that the newest approved topical field treatment, turbanibulin, 1% ointment showed an Initial complete clearance of 44-54% (trial 1 vs trial 2) and an estimated 27% sustained complete clearance after one year. [Reference: Steeb, T., Wessely, A., Petzold, A., Schmitz, L., Dirschka, T., Berking, C., & Heppt, M. V. (2021). How to assess the efficacy of interventions for actinic keratosis?A review with a focus on long-term results. *Journal of Clinical Medicine*, 10(20), 4736.]

Currently, cryotherapy with liquid nitrogen is the single most utilized treatment for Aks employed by Dermatologists and PCPs. It has been estimated that about 70% of lesion-directed AK medical therapies use cryotherapy. Treatment of Aks with liquid nitrogen or other cryogenic liquids cause pain and inflammation at the application site and surrounding tissue. The pain and inflammation typically subside within the 24-hour post treatment. However, recurrence of the cryotherapy treated Aks occur at the rate of approximately 35-40%.

The pain, inflammation and edema that are typical adverse side effects of treatment by field related AK treatments, including 5-fluorouracil (5-FU), diclofenac, peroxicam, trichloroacetic acid, various alpha- and beta-hydroxy acids, imiquimod, ingenol mebutate, and turbanibulin, are typically more severe and are more sustained than cryotherapy or PDT and are marked with moderate to severe skin erythema, peeling, swelling, and erosion.

The reoccurrence of Aks may be due, at least in part, to infection of the AK lesions by human papillomavirus (HPV). A 2007 publication showed that 37% of AK lesions were HPV positive vs 0% for the controls and that the HPV infected AK lesions recurred at a 100% rate following treatment with cryotherapy. [Reference: Dianzani, C., Pierangeli, A., Chiricozzi, A., Avola, A., & Degener, A. M. (2008). Cutaneous human papillomaviruses as recurrence factor in actinic keratoses. *International Journal of Immunopathology and Pharmacology*, 21(1), 145-152].

SUMMARY OF THE DISCLOSURE

The present disclosure relates to compositions and methods that use one or more chlorin compounds and/or complexes, or other chlorophyll-related porphyrin compounds, for the treatment and/or prevention of actinic keratosis. In some preferred embodiments, the chlorin compounds comprise one or more copper chlorin compounds or chelated copper chlorin compounds. In other preferred embodiments, the chlorin compounds comprise one or more copper chlorin complexes or chelated copper chlorin complexes. Unless one or the other is specifically being referenced, both copper chlorin compounds and copper chlorin complexes are referred to herein generally as copper chlorin for brevity and include acid and salt forms thereof unless specifically excluded.

In still other preferred embodiments, the chlorin compounds comprise a chelated zinc chlorin, a chelated iron chlorin, a chelated nickel chlorin, a chelated cobalt chlorin, or a chelated manganese chlorin. Unless a specific divalent metal chelate is being referenced, references herein to a chlorin generally refer to any of a copper chlorin or any of the foregoing other metal chelated chlorins. Additionally, the terms "chelated [metal] chlorin" and "[metal] chlorin" (e.g., chelated copper chlorin and copper chlorin) are used interchangeably herein.

In some embodiments, a treatment composition comprises a safe and effective concentration of chlorin for treatment and/or prevention of one or more actinic keratosis lesion or actinic keratoses. In some embodiments, a treatment composition may comprise around 0.001% to about 1% of chlorin by weight.

In some embodiments, a treatment composition comprises a safe and effective concentration of copper chlorin for treatment and/or prevention of actinic keratosis. In some embodiments, a treatment composition may comprise around 0.001% to about 1% of copper chlorin by weight.

In some embodiments, a copper chlorin used in a treatment composition herein may comprise at least 75% by weight of one or more of trisodium copper (II) chlorin e6, disodium copper (II) isochlorin e4, sodium copper (II) rhodin g7, sodium copper (II) rhodochlorin, or sodium copper (II) chlorin p6.

In still other embodiments, a copper chlorin used in a treatment composition herein may comprise (1) at least 30% by weight (total) of disodium copper (II) isochlorin e4 or trisodium copper (II) chlorin e6 or a combination thereof and (2) one or more of (a) chlorin e4, (b) isochlorin e4, (c) copper chlorin e4, (d) copper isochlorin e4, (e) chlorin e6, (f) copper chlorin p6, (g) copper pheophorbide a, (h) copper pyropheophorbide a, (i) copper purpurin 7, (j) copper rhodin g7, (k) copper rhodochlorin, and (l) oxidized forms and/or salts of (a)-(k).

In other embodiments a copper chlorin used in a treatment composition herein may comprise an acid or salt forms of (a) copper (II) chlorin e6, (b) copper (II) isochlorin e4, (c) copper (II) chlorin p6, (d) copper (II) rhodin g7, (e) copper (II) rhodochlorin, (f) copper (II) purpurin 7, and/or (g) copper (II) chlorin e4 wherein the valence of the chelated copper compound of (a)-(g) is +2 expressed as (II).

In another preferred embodiment, a copper chlorin used in a treatment composition disclosed herein is part of a copper chlorophyllin complex salt. In some embodiments, a copper chlorophyllin complex salt is a sodium, potassium, or sodium potassium salt or mixture thereof. In these embodiments, a copper chlorin from the copper chlorophyllin complex salt may comprise an acid or salt form of one or more of (a) copper (II) chlorin e6, (b) copper (II) isochlorin e4, (c) copper (II) chlorin p6, (d) copper (II) rhodin g7, (e) copper (II) rhodochlorin, (f) copper (II) purpurin 7, and (g) copper (II) chlorin e4. The chlorophyllin copper complex may also be called chlorophyllin cu complex, chlorophyllin copper sodium complex, chlorophyllin-copper complex, copper sodium chlorophyllin, copper sodium complex chlorophyllin, or simply copper chlorophyllin and will also be referred to in this application as a copper chlorin complex.

In another embodiment, a treatment composition may comprise alkali salts of copper chlorins such as, for example, sodium and potassium salts which may be mono-, di-, or tri-alkali salts or a combination of sodium and potassium salts of the chelated copper chlorin compounds.

In another embodiment, a treatment composition may comprise acid or salt forms of copper chlorin wherein the copper (II) metal chelate is replaced with other divalent metal chelates that may include one or more of zinc, iron, nickel, cobalt, and manganese.

In some embodiments, a treatment composition contains one or more prodrugs of a copper chlorin compound wherein the carboxylic acid groups emanating from one or more of the number 13, 15, and 17 positions of the tetrapyrrole core of the chlorin molecule is fully or partially esterified by one or more short or long chain ester groups and wherein the resulting copper chlorin compound or salt thereof is a mono-ester, di-ester, or tri-ester or a mixture thereof and wherein the numbering of the tetrapyrrole core of the copper chlorin follows that described by Tumolo, T., & Lanfer-Marquez, U. M. (2012). Copper chlorophyllin: A food colorant with bioactive properties?. *Food Research International*, 46(2), 451-459, which is incorporated herein by reference and the numbering system as used in the Tumolo reference is included as FIG. 3 wherein the 13, 15, and 17 carbon positions of the tetrapyrrole group of various chlorin compounds are clearly labeled. For example, a prodrug may be a monomethyl, dimethyl, or trimethyl ester; a monoethyl, diethyl, or triethyl ester or a combination thereof. In other embodiments, a prodrug ester group may be supplied by C2-alky, alkoxy or longer chain group or by short chain glycols or by polyethylene or polypropylene glycols. In other embodiments one or more of the carboxyl groups in the 13, 15, and 17 positions may be modified to create phosphate, carbamate, amide, oxime or carbonate copper chlorin compounds. Such prodrug examples can improve the topical skin penetration, stability, and solubility of the parent copper chlorin compound and may also be used to change the pharmacodynamics and pharmacokinetics of the parent, unmodified copper chlorin compound to increase the tissue residence time and prolong the activity and efficacy.

In some embodiments, a treatment composition may comprise a copper chlorin and a carrier vehicle. A carrier vehicle is one suited for topical application of a treatment composition. A carrier vehicle may be an aqueous or in a non-aqueous pharmaceutical vehicle wherein the vehicle is in the form of a solution, suspension, gel, emulsion, microemulsion, nanosuspension, liposomal dispersion, lotion, cream, solid, aerosol or non-aerosol spray. When a non-aqueous pharmaceutical vehicle, or a solid pharmaceutical vehicle, or an aqueous gel, lotion, or cream pharmaceutical vehicle is used, copper chlorin is preferably evenly dispersed or solubilized therein.

In some embodiments, a treatment composition may comprise a copper chlorin solubilized in a topical aqueous solution or gel or solubilized in the water phase of an emulsion or microemulsion.

In other embodiments, a treatment composition may comprise copper chlorin in a pharmaceutical vehicle comprising one or more pharmaceutical grade compounds. Such pharmaceutical grade compounds may include aqueous solvents, non-aqueous solvents, skin penetrants or penetration enhancing agents, antioxidants, preservatives, emulsifiers, viscosity modifiers, thickeners, surfactants, emollients, humectants, keratolytics, skin softening agents, emulsion stabilizers, pH adjusters, buffering agents, color additives, colorants, suspending agents, UV-A filters, UV-B filters, UV-C-filters, mineral oils, mineral waxes, vegetable oils, vegetable waxes, polyethylene glycols, PEG glyceryl esters, film-forming polymers, emollients, and/or opacifiers. Any of these pharmaceutical grade compounds may also be excluded from a treatment composition according to some embodiments.

In some embodiments, copper chlorin is the only active antiviral ingredient in a treatment composition for treatment and/or prevention of actinic keratosis. In these embodiments, a treatment composition may comprise one or more other active ingredients, which may include pharmaceutical grade compounds as previously described, that aid in topical skin penetration, tissue residence time, stability, and/or solubility of the copper chlorin. In these embodiments, a treatment composition may also include one or more other inactive ingredients, vehicle ingredients, and/or pharmaceutical grade compounds. In other embodiments the copper chlorin compound may be combined with one or more antiviral drug compounds such as acyclovir, penciclovir, cidofovir, ganciclovir, NITD008, enviroxime, molnupiravir or the active form EIDD-1931, ribavirin, favipiravir, rupintrivir, remdesivir, tenofovir, disoproxil, and 9-[2-phosphono-methoxy]-ethylguanine.

In some embodiments, copper chlorin is the only active ingredient in a treatment composition for treatment and/or prevention of actinic keratosis. In these embodiments, a treatment composition may comprise one or more inactive ingredients and/or vehicle ingredients.

In some embodiments, a method of treating and/or preventing actinic keratosis may comprise applying a treatment composition comprising copper chlorin to one or more actinic keratosis on a human, canine, or feline. In some embodiments, a treatment composition comprising copper chlorin is topically applied to one or more actinic keratosis on a human, canine, or feline. In some embodiments, a method of treating and/or preventing actinic keratosis may comprise applying a treatment composition according to an embodiment disclosed herein to one or more actinic keratosis present on a human, canine, or feline.

In some embodiments, a method of treating and/or preventing AK may further comprise diagnosing a patient with actinic keratosis, preferably prior to applying a treatment composition comprising a chlorin. In some embodiments, diagnosing a patient may comprise one or more of (1) a physical, medical examination of the patient, (2) obtaining and considering a medical history of the patient, (3) visual evaluation of the lesion for suspected actinic keratosis, (4) obtaining a tissue sample from the suspected lesion on the patient, and/or (5) evaluation of the tissue sample by a medical professional to determine if the patient has AK. In some embodiments, steps (1)-(5) may be carried out by one or more medical professionals. In some embodiments, a patient is a human patient and the medical professional is a medical doctor, a pathologist, a nurse practitioner, or a physician assistant. In other embodiments, a patient is a canine or feline, preferably a domesticated pet, and the medical professional is a veterinary doctor or a qualified veterinary assistant. A diagnosis of actinic keratosis is preferably made prior to applying a treatment composition comprising a chlorin, preferably a treatment composition according to embodiments herein.

In some embodiments, a dose of a treatment composition comprising a chlorin is applied one to four times in a day on a daily, once weekly, twice weekly, three times weekly, or on every other day basis over a treatment period. The treatment period may be anywhere from 1 to 30 days. Ideally, the treatment period is daily for two weeks. However, a treatment course may comprise multiple treatment periods, with or without periods of no treatment in between. An application rate may vary over the course of a treatment period or a treatment course and may include days or weeks without any treatment intermixed with applications multiple times per day and/or multiple days per week. Any combination of a number of treatment application doses at any periodic timing within a treatment period may be used with or without days of no treatment application. A treatment composition herein is preferably applied to one or more actinic keratosis and the skin tissue immediately surrounding the actinic keratosis that does not display any signs of actinic damage. A treatment composition herein may also be applied to a large area of skin such as the skin of the face, scalp, arms, legs, torso, or any area of skin displaying multiple Aks over an extensive skin area wherein application of the compositions of the embodiment can be applied to such wide areas of skin displaying areas of multiple Aks interspersed with areas of skin not displaying Aks.

A dose of a treatment method comprising a chlorin, when in a liquid, solid or semisolid form for treatment of a single AK lesion (lesion-directed treatment) may be around 0.01-0.3 mL or 0.01-0.3 g for an AK lesion of 0.1-5 cm. Field-directed treatments for Aks will vary based on the total skin area of treatment and may be around 0.1-1.0 mL or 0.1-1.0 g for treatment of multiple Aks over skin areas of 10-300 cm$^2$.

In some embodiments, one or more pretreatments and/or post-treatments, and/or simultaneous treatments may be used in conjunction with application of a treatment composition comprising a chlorin. Such pretreatments, post-treatments, and/or simultaneous treatments may include microdermabrasion, curettage, cryotherapy/cryosurgery (such as with liquid nitrogen), surgery, photodynamic therapy, topical treatment with one or more field-directed AK treatments such as topical treatments with trichloroacetic acid, a beta or alpha-hydroxy acid, a retinoid, 5-fluorouracil (5-FU), diclofenac, peroxicam, imiquimod, ingenol mebutate, and turbanibulin.

In other embodiments, the treatment of the Aks with copper chlorin may be pretreated, post-treated, and/or simultaneously treated with broad spectrum suncreens containing one or more UV-A, UV-B, or UV-C absorption compounds or UV-A, UV-B, and UV-C light scattering compounds such as zinc oxide and titanium dioxide. In still other embodiments, the sunscreen compound used may be ISDINS Eryfototana AK-NMSC SPF 100+ fluid or cream.

In other embodiments, copper chlorin may be combined with one or more sunscreens to both clear the AK lesions and protect the skin from induction of new Aks by solar radiation or from UV tanning beds.

In other embodiments, copper chlorin may be combined with or used before or after treatment with one or more experimental AK treatments now in clinical trials including PEP005 topical gel, VDA-1102 ointment, LFX453 topical, BF-200 ALA (Amelaz) PDT treatment, Resiquimod topical treatment, Carac cream treatment, Oleogel-S-10 treatment, GDC695 topical treatment, LAS41005 topical treatment, SR-T100 gel treatment, calcipotriene topical treatment, calcipotriol topical treatment, KX2-391 topical 1% ointment, Solarmargine topical treatment, AVX001 topical gel, 1% or 3%, Green Tea Extract Topical Treatment, and perillyl alcohol treatment.

Treatment compositions and methods according to embodiments herein are useful in treating Aks, including those that have not been cleared by prior art treatments or have recurred after prior treatments. Treatment compositions and methods according to embodiments herein can clear Aks at a higher rate, prevent recurrence of the cleared Aks without the pain, inflammation, and edema associated with current state of the art treatments of Aks. Unlike the prior art treatments, treatment compositions and methods according to embodiments herein have an anti-viral impact to provide complete cytotoxicity of the HPV infected Aks thereby eliminating or reducing the chance of recurrence of the AK.

BRIEF DESCRIPTION OF THE DRAWINGS

The compositions and methods of the disclosure are further described and explained in relation to the following figures wherein:

FIG. 1a is a Baseline photo of target AK lesion prior to treatment; patient AK001;

FIG. 1b is a photo of target AK lesion after daily treatments with Formula PB-01-068 (Table 4) for 11 days; Patient AK001;

FIG. 2a is a Baseline photo of target AK lesion prior to treatment; patient AK002;

FIG. 2b is a photo of target AK lesion after daily treatments with Formula PB-01-073 (Table 5) for 11 days; Patient AK002;

DETAILED DESCRIPTION

The present disclosure relates to compositions and methods that use one or more chlorins or other chlorophyll-related porphyrin compounds for the treatment and/or prevention of Actinic Keratosis.

Treatment Compositions

Preferred treatment compositions may be configured for topical application to one or more actinic keratosis or on an area of human, canine, or feline skin that has one or more Aks or an area of skin that has previously had one or more AKs. In one preferred embodiment, a treatment composition may comprise a chlorin in an effective amount to treat and/or prevent AKs, and most preferably to both completely clear the existing AK lesion or lesions and to eradicate the HPV strain that may be infecting the AK to prevent recurrence of the AK.

Preferred chlorins for use in a treatment composition herein are copper chlorins, zinc chlorins, iron chlorins, nickel chlorins, cobalt chlorins, and manganese chlorins. Any of these chlorins may be used individually to the exclusion of any other chelated metal chlorin, such as the use of only one or more copper chlorins without any iron chlorins, nickel chlorins, cobalt chlorins, or manganese chlorins. Any of these chlorins may also be used in any combination with one or more other chelated metal chlorins, such as the use of one or copper chlorin with one or more zinc chlorins.

In some embodiments, a treatment composition may preferably comprise one or more chlorins in a total concentration of around 0.001% to about 1%, more preferably around 0.01% to 0.25%, and most preferably around 0.01% to 0.1% by weight of the treatment composition. In some embodiments, a treatment composition may comprise one or more copper chlorins in a total concentration of around 0.001% to about 1%, more preferably around 0.01% to 0.25%, and most preferably around 0.01% to 0.1% by weight of the treatment composition. The balance of the treatment composition in these embodiments may comprise a carrier (also referred to herein as a vehicle or a pharmaceutical carrier or a pharmaceutical vehicle) with or without one or more other active ingredients and with or without one or more inactive ingredients. Other active ingredients may comprise other anti-viral ingredients or other ingredients that enhance functionality of the copper chlorin or the other anti-viral ingredient(s). Such enhanced functionality may include aiding in topical skin penetration, tissue residence time, stability, and/or solubility of the copper chlorin and/or other anti-viral ingredient(s) and prevention or protection from UV-A, UV-B, and UV-C solar radiation.

Figure 3:
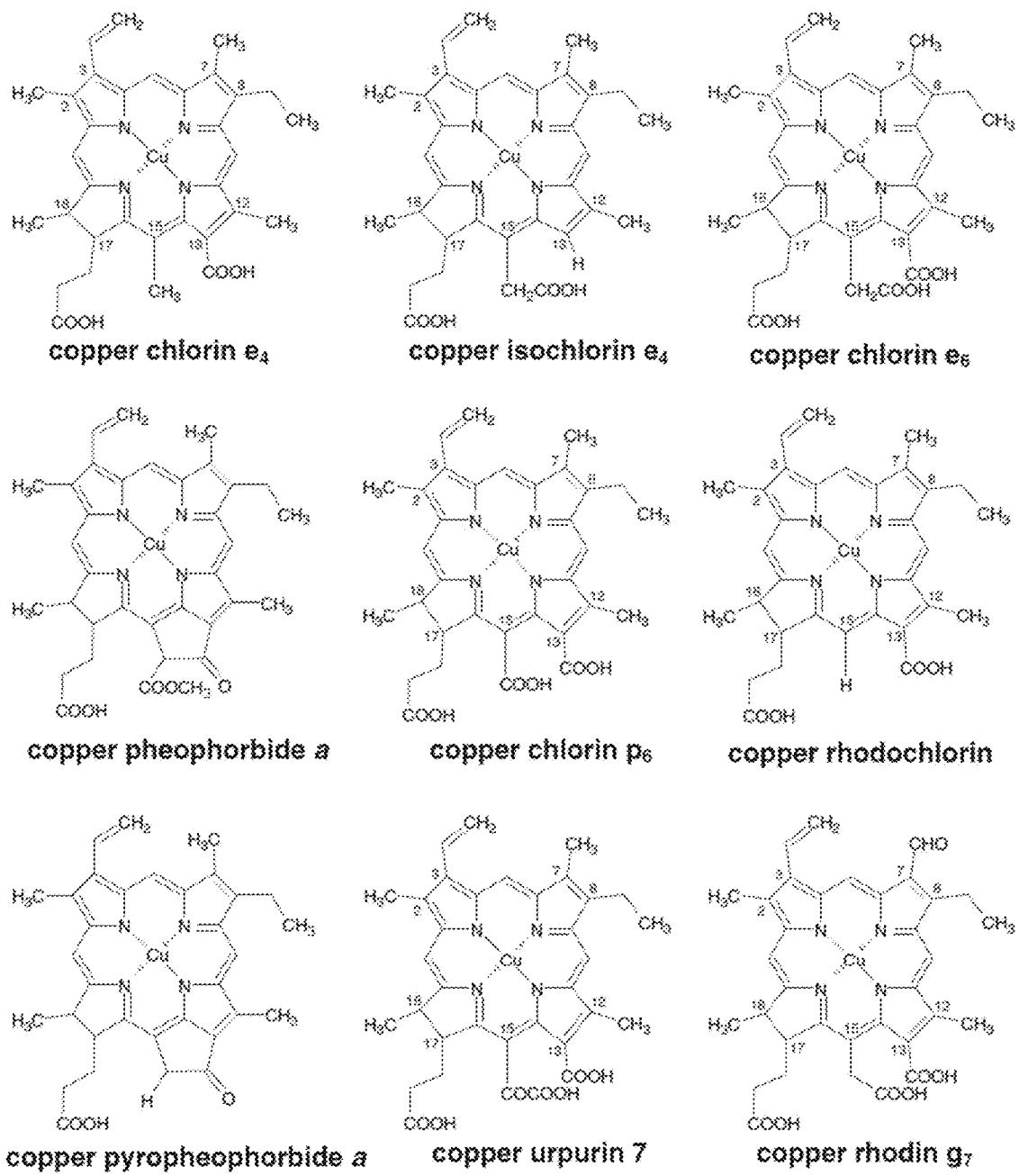
FIG. 3 shows the numbering system for the 13, 15, & 17 ring positions and potential reaction sites of the hydroxyl groups emanating from these ring positions of the tetrapyrrole structures of selected chlorin compounds as published by Tumolo et al in *Food Research International* 46 (2012) 451-459.

A treatment composition may comprise one or more of: (1) trisodium copper (II) chlorin e6, (2) disodium copper (II) isochlorin e4, (3) sodium copper (II) rhodin g7, (4) sodium copper (II) rhodochlorin, (5) sodium copper (II) chlorin p6, (6) chlorin e4, (7) isochlorin e4, (8) copper chlorin e4, (9) copper isochlorin e4, (10) chlorin e6, (11) copper chlorin p6, (12) copper pheophorbide a, (13) copper pyropheophorbide a, (14) copper purpurin 7, (15) copper rhodin g7, (16) copper rhodochlorin, (17) copper chlorophyllin complex salt (preferably a sodium, potassium, or sodium potassium salt or mixture thereof), (18) acid or salt forms of copper chlorin wherein the copper (II) metal chelate is replaced with other divalent transition metal chelates that may include one or more of (a) zinc, (b) iron, (c) nickel, (d) cobalt, and (e) manganese, (19) alkali salts of copper chlorins such as, for example, sodium and potassium salts which may be mono-, di-, or tri-alkali salts or a combination of sodium and potassium salts of the chelated copper chlorin compounds, (20) one or more prodrugs of a copper chlorin compound wherein the carboxylic acid groups emanating from one or more of the number 13, 15, and 17 positions of the tetrapyrrole core is fully or partially esterified by one or more short or long chain ester groups and wherein the resulting copper chlorin compound or salt thereof is a mono-ester, di-ester, or tri-ester or a mixture thereof and wherein the numbering of the tetrapyrrole core of the copper chlorin follows that described by Tumolo, T., & Lanfer-Marquez, U. M. (2012). Copper chlorophyllin: A food colorant with bioactive properties?. *Food Research International*, 46(2), 451-459, as shown in FIG. 3 and/or (21) oxidized forms and/or salts of (1)-(20).

A copper chlorin used in a treatment composition may comprise at least 75% by total weight of one or more of (1) trisodium copper (II) chlorin e6, (2) disodium copper (II) isochlorin e4, (3) sodium copper (II) rhodin g7, (4) sodium copper (II) rhodochlorin, or (5) sodium copper (II) chlorin p6. The copper chlorin used in a treatment composition may comprise at least 80%, preferably at least 85%, more preferably at least 90%, and most preferably at least 95% by total weight of one or more of the specific copper chlorins in (1)-(5) in this paragraph.

A copper chlorin used in a treatment composition may comprise at least 75% by weight, or at least 80% by weight, preferably at least 85% by weight, more preferably at least 90% by weight, and most preferably at least 95% by weight of trisodium copper (II) chlorin e6. A copper chlorin used in a treatment composition may comprise at least 75% by weight, or at least 80% by weight, preferably at least 85% by weight, more preferably at least 90% by weight, and most preferably at least 95% by weight of disodium copper (II) isochlorin e4. A copper chlorin used in a treatment composition may comprise at least 75% by weight, or at least 80% by weight, preferably at least 85% by weight, more preferably at least 90% by weight, and most preferably at least 95% by weight of sodium copper (II) rhodin g7. A copper chlorin used in a treatment composition may comprise at least 75% by weight, or at least 80% by weight, preferably at least 85% by weight, more preferably at least 90% by weight, and most preferably at least 95% by weight of sodium copper (II) rhodochlorin. A copper chlorin used in a treatment composition may comprise at least 75% by weight, or at least 80% by weight, preferably at least 85% by weight, more preferably at least 90% by weight, and most preferably at least 95% by weight of sodium copper (II) chlorin p6.

A treatment composition herein may also comprise other porphyrin compounds, other specific copper chlorins, and/or specific combinations thereof. In some embodiments, a treatment composition may comprise (1) a chlorin that is at least 30% by weight (total, of the chlorin, not the treatment composition) of (a) disodium copper (II) isochlorin e4 or (b) trisodium copper (II) chlorin e6 or (c) a combination thereof or (d) oxidized forms and/or salts of (1)(a)-(1)(c) and (2) one or more of (a) chlorin e4, (b) isochlorin e4, (c) copper chlorin e4, (d) copper isochlorin e4, (e) chlorin e6, (f) copper chlorin p6, (g) copper pheophorbide a, (h) copper pyropheophorbide a, (i) copper purpurin 7, (j) copper rhodin g7, (k) copper rhodochlorin, and (l) oxidized forms and/or salts of (2)(a)-(2)(k).

In other embodiments, a treatment composition herein may comprise (1) a chlorin that is at least 30% by weight (total, of the chlorin, not the treatment composition) of (a) disodium copper (II) isochlorin e4 or (b) trisodium copper (II) chlorin e6 or (c) a combination thereof or (d) oxidized forms and/or salts of (1)(a)-(1)(c) and (2) at least one chlorin compound selected from the group consisting of (a) chlorin e4, (b) isochlorin e4, (c) copper chlorin e4, (d) copper isochlorin e4, (e) chlorin e6, (f) copper chlorin p6, (g) copper pheophorbide a, (h) copper pyropheophorbide a, (i) copper purpurin 7, (j) copper rhodin g7, (k) copper rhodochlorin, and (l) oxidized forms and/or salts of (2)(a)-(2)(k). In other embodiments a treatment composition herein may comprise an acid or salt forms of (1) copper (II) chlorin e6; (2) copper (II) isochlorin e4; (3) copper (II) chlorin p6; (4) copper (II) rhodin g7; (5) copper (II) rhodochlorin; (6) copper (II) purpurin 7; and/or (7) copper (II) chlorin e4 wherein the valence of the chelated copper is +2 expressed as (II) in compounds 1-7.

A topical treatment composition herein may be in the form of a solution, suspension, gel, emulsion, microemulsion, nanosuspension, liposomal dispersion, lotion, cream, solid, aerosol or non-aerosol spray. A treatment composition herein may be in an aqueous or in a non-aqueous pharmaceutical vehicle. A treatment composition herein may comprise one or more other active, inactive, and/or vehicle ingredients. Such ingredients may include one or more of aqueous solvents, non-aqueous solvents, skin penetrants or penetration enhancing agents, antioxidants, preservatives, emulsifiers, viscosity modifiers, thickeners, surfactants, emollients, humectants, keratolytics, skin softening agents, emulsion stabilizers, pH adjusters, buffering agents, color additives, colorants, suspending agents, UV-A filters, UV-B filters, UV-C filters, mineral oils, mineral waxes, vegetable oils, vegetable waxes, polyethylene glycols, PEG glyceryl esters, film-forming polymers, emollients, and/or opacifiers. A treatment composition herein may comprise 0.5-95% by weight water, preferably deionized water.

In some preferred embodiments, a treatment composition for topical application to skin Aks may comprise one or more copper chlorins that is first dissolved in a liquid vehicle comprising: water, a skin penetrant, a viscosity modifier, and a preservative. Skin penetrants may include compositions or compounds comprising diethylene glycol monoethyl ether and/or dimethyl isosorbide and/or both.

Preferred skin penetrants may include Transcutol® P and/or Transcutol® HP (Gattefosse' Co.) brands, which are purified forms of diethylene glycol monoethyl ether. Viscosity modifiers may include composition or compounds comprising hydroxyethylcellulose and/or carboxymethylcellulose, xantham gum, guar gum, carrageenan, polyethylene oxide polymers, Carbopol® and other carbomer polyacrylate polymers.

A preferred viscosity modifier is Natrosol® 250HX Pharma brand (BASF Corp.). A preservative may include compositions or compounds comprising (1) phenoxyethanol, (2) benzoic acid or sodium or potassium benzoate, (3) phenylethyl alcohol, (4) sorbic acid or sodium or potassium sorbate, (5) short chain glycols including, propylene, butylene, pentylene, isopentylene, and hexylene glycols, (6) benzalkonium chloride, (7) ethanol, (8) isopropanol, (9) chlorbutanol. (10) methylparaben, (11) butylparaben, and/or (12) propylparaben.

Such a treatment composition may comprise (by weight percentage) around (1) 0.001-1.0%, more preferably 0.005-0.5%, and most preferably 0.01-0.1% total of one or more copper chlorins; (2) 2.5-60%, more preferably 5-40%, and most preferably 10-20% total of one or more skin penetrants (preferably Transcutol P); (3) 0.1-2.0%, more preferably 0.2-1.5%, and most preferably 0.3-1.2% of a viscosity modifier (preferably hydroxyethylcellulose and more preferably Natrosol® 250HX or benzene-free Carbomer (934, 940, or 980); (4) 0.1-1.0%, more preferably 0.25-1.0%, and most preferably 0.6-1.0% of a preservative (preferably phenoxyethanol or phenylethyl alcohol); and (5) 0.5-95%, more preferably 20-90%, and most preferably 40-80% deionized water.

When a skin penetrant comprising dimethyl isosorbide is used in a treatment composition, a concentration (by weight) of the dimethyl isosorbide is preferably around 40% or less. In some preferred embodiments, a treatment composition may comprise the ingredients in the preceding paragraph but may use other skin penetrants to replace or supplement the diethylene glycol monoethyl ether and dimethyl isosorbide. Such other skin penetrants may include one or more of dimethyl sulfoxide, methylsulfonylmethane, propylene glycol monolaurate, propylene glycol monocaprylate, propylene glycol, butylene glycol, pentylene glycol, isopentylene glycol, hexylene glycol, ethanol, terpenes, Azone® (1-N-dodecyl Nitrogen heterocycle heptan-2-one) acetamide MEA, tetrahydropiperine, polyethylene glycol glyceryl esters, Levomenol, N-methyl-2-pyrrolidone, or other skin penetrant compounds listed in "CPE-DB: An Open Database of Chemical Penetration Enhancers" (Vasyuchenko, E. P., et al, *Pharmaceutics,* 2021; 13(1), 66). as will be understood by those of ordinary skill in the art.

In some embodiments, the overall effectiveness of treatment compositions according to the disclosure may be enhanced by increasing the rate of penetration by increasing the total amount of penetration enhancing agents. The total amount of penetration enhancing agents may be increased, independent of the concentration of copper chlorin, wherein, a higher amount of total penetration enhancing agents may be used for treatment of Olsen grade III AKs and a lesser amount of total penetrants for treatment Olsen grade I and II AKs.

In another embodiment, the overall effectiveness of a treatment compositions herein, based on rate of AK reduction or time to AK clearance, may be enhanced by encapsulating one or more copper chlorins in a liposomal or nanosomal delivery system wherein the copper chlorin(s) are contained in phospholipid liposomes or nanosomes that range between 40-300 nm average particle diameter.

In some preferred embodiments, a treatment composition may comprise one or more of disodium copper isochlorin e4, trisodium copper chlorin e6, and/or trisodium copper chlorin p6 at a concentration of 10 µg/mL (0.001% by weight) or more. In other preferred embodiments, a treatment composition may comprise one or more sodium copper chlorophyllin complex (copper chlorin complex), trisodium copper chlorin e6, and/or disodium copper isochlorin e4 at a concentration of 10 µg/mL (0.001% by weight) or more.

Ak Diagnosis & Treatment Methods

Early diagnosis of precancerous actinic keratosis lesions is important to initiate treatment and to reduce or prevent the development of cutaneous squamous cell carcinoma (cSCC) and the possibility of invasive and metastatic SCC. AK lesions will develop in areas of skin chronically exposed to the sun. The photodamaged areas of skin can contain areas of "field cancerization"; areas that refer to the anatomical regions encompassing or neighboring AK lesions within visibly photodamaged skin. Regions of photodamaged skin are marked by pigmentary alterations, coarse texture, thinning, or telangiectasia, and these are areas of skin where AK lesions can evolve into cSCC.

There are several methods for identifying and grading the severity of AKs. The Olsen grading method (Olsen E A et al (1991) *A double-blind, vehicle-controlled study evaluating masoprocol cream in the treatment of actinic keratoses on the head and neck*. J. Am Acad Dermatol 24:738-743) is a common and simple method of visual clinical grading of AKs based on thickness of the lesion and degree of hyperkeratosis. However, the Olsen clinical assessment and classification does not always agree with histological findings when and if the AKs are biopsied, especially the grading of the more advanced Olsen grade III AKs.

The Olsen clinical grading scale for AKs that was originally described in 1991 is as follows:

Olsen Grade 1 (Mild): Early actinic keratoses appear as single or few, differently sized rough, blurred, less visible than palpable (palpable on the roughness of the surface), red, rough spots or very flat, non-edged plaques which reach into the reddish color and are easier to feel than to see.

Olsen grade 2 Moderate): Advanced actinic keratoses as clearly visible and palpable, flat and irregularly raised, with sharp or blurred boundaries, red, rough keratinized surface. If the surface is more strongly keratinized, the actinic keratosis can also be white, yellow or light brown. After scratching effects (frequently), a black or blue-black shade may appear (older bleeding), Olsen grade 3 (Severe): Late stage actinic keratoses that have existed for a longer period of time and are firmly anchored on the lower surface, with an irregular, humpy surface, also wart-like and of different colors (white, brown, black). When the horn deposits are removed, an erosive subsurface is formed.

The Olsen Grade 3 lesions can at times be difficult to clinically distinguish from early squamous cell carcinoma such as SCC in situ.

More recently, for the grading of multiple AKs, a 2017 publication (*Acta Dermato-Venereologica*, 2017, vol. 97, num. 9, p. 1108-1113) suggested an actinic keratosis field assessment scale ("AK-FAS") for grading the severity of the AK field. The publication recommended grading AK severity based on 1) percent of the facial or scalp photodamaged skin area covered with AKs, 2) the hyperkeratosis severity, and 3) the severity of the sun damage, A 2023 publication [Journal of the American Academy of Dermatology, 88(6), 1317-1325] proposed guidelines for the dermatopathologic diagnosis of AKs and cSCC. The publication made consensus recommendations for the key dermatopathological features necessary for the clinical and histological diagnosis and differentiation of actinic keratosis, hyperkeratotic actinic keratosis, cutaneous squamous cell carcinoma, and keratoacanthoma.

In some embodiments, a method of treating and/or preventing AK may comprise applying chlorin to one or more AK on a human, canine, or feline. Preferably, a method of treating Aks may comprise applying a copper chlorin, and most preferably a treatment composition according to various embodiments herein, to one or more AKs on a human, canine, or feline. In some embodiments, a treatment composition comprising a chlorin, and preferably a copper chlorin, is topically applied to one or more AKs on a human.

In some embodiments, a method of treating and/or preventing AK may comprise diagnosing a patient with actinic keratosis, preferably prior to applying a treatment composition comprising a chlorin. In some embodiments, diagnosing a patient may comprise conducting a physical, medical examination of the patient, that may include a medical history and visual evaluation of the lesion for suspected actinic keratosis. In some embodiments, diagnosing a patient may comprise conducting a biopsy of a tissue sample from a lesion on the patient and evaluation of the tissue sample by a medical professional. In some embodiments, the tissue sample may be obtained by one medical professional and the evaluation of the tissue sample may be made by a second medical professional. In some embodiments, the evaluation may comprise sectioning and staining the biopsied AK tissue sample by methods known in the art that use histoimmunochemical staining methods and microscopic evaluation of the stained biopsy tissue. In some embodiments, use of dermoscopic methods to directly view the one or more presumptive AK lesions may be used by a trained medical professional.

In some embodiments, viewing the tissue sample under a microscope, conducting computational or spectrographic tests of the tissue sample, or chemical analyses of the tissue sample, or a combination thereof may be used. In some embodiments, diagnosing a patient may comprise one or more of (1) a physical, medical examination of the patient, (2) obtaining and considering a medical history of the patient, (3) visual evaluation of the lesion for suspected actinic keratosis, (4) obtaining a tissue sample from the suspected lesion on the patient, and/or (5) evaluation of the tissue sample by a medical professional to determine if the patient has AK. In some embodiments, steps (1)-(5) may be carried out by more than one medical professional. In some embodiments, a patient is a human patient and the medical professional is a medical doctor, a pathologist, a nurse practitioner, or a physician assistant. In other embodiments, a patient is a canine or feline, preferably a domesticated pet, and the medical professional is a veterinary doctor or a qualified veterinary assistant. A diagnosis of actinic keratosis is preferably made prior to applying a treatment composition comprising a chlorin.

In some embodiments, a dose of a treatment composition comprising copper chlorin is applied one to four times in a day on a daily, a once weekly, a twice weekly, three times weekly, or every other day basis over a treatment period. The treatment period may be anywhere from 1 to 30 days or longer. A treatment course may comprise multiple treatment periods, with or without periods of no treatment in between. An application rate may vary over the course of a treatment period or a treatment course and may include days or weeks without any treatment intermixed with applications once daily or multiple times per day and multiple days per week. Any combination of a number of treatment application doses at any periodic timing within a treatment period may be used with or without days of no treatment application. A treatment composition herein is preferably applied to one or more AKs and tissue surrounding one or more AKs. A treatment composition herein may also be applied during a treatment period to an area in which an AK was present at the beginning of one of the treatment periods in a treatment course but has been cleared by use of the treatment composition or has become visually imperceptible during a treatment period.

In other embodiments, application of a treatment composition disclosed herein results in preferably 50-75% clearance of the Aks treated, more preferably 65-85% clearance of the Aks treated, and most preferably 85-100% clearance of the Aks treated, wherein percent clearance is measured by determining by visual inspection the AK lesions that show no remaining AK (100% clearance) or less than 25% of the AK lesion present (>75% clearance) when compared to before treatment.

In other embodiments, application of a treatment composition according to the disclosure results in preferably 30-50% of AK lesions treated showing 100% clearance, more preferably 40-60% of the AK lesions showing 100% clearance, and most preferably 50-90% of the AK lesions showing 100% clearance.

In another embodiment, application of a treatment composition according to the disclosure results in preferably less than 15-30% recurrence of the treated Aks in 60 days or less, more preferably less than 10-20% recurrence of the treated Aks in 60 days or less, and most preferably less than 0.5-10% recurrence of the treated Aks in 60 days or less.

In another embodiment, application of a treatment composition according to the disclosure results in preferably less than 20-40% recurrence of the treated Aks in 12 months or less, more preferably less than 15-25% recurrence of the treated Aks in 12 months or less, and most preferably less than 5-15% recurrence of the treated Aks in 12 months or less.

In another embodiment, the treatment method may comprise applying a treatment composition of an embodiment herein or a solution comprising a chlorin, preferably a copper chlorin, to the AK or Aks with a nonwoven or natural fiber applicator such as a swab or applied directly from a unit dose package delivery system or multiple application system such as a tube, metered or non-metered pump dispenser, aerosol or non-aerosol spray, applicator stick, or other packaging or device that allows dispensing of a quantity of the compound in a vehicle that adequately treats the AK. The amount of a treatment composition according to embodiments herein that is applied to any single AK ranging in size from 0.1-5 cm is preferably around 0.01-0.3 mL or 0.01-0.3 g in a liquid, solid or semisolid form is applied. An amount of copper chlorin topically to each such AK ranges from about 0.5-500 ug, more preferably 5-250 µg, and most preferably 10-200 µg.

In other embodiments, efficacy, in terms of clearance and recurrence of one or more AK by a treatment composition according to the disclosure may be enhanced with one or more pretreatments prior to application of the treatment composition or after the application of the copper chlorin treatment composition and/or between applications of the treatment composition. Such pretreatments or post-treatments may include one or more of cryotherapy, photodynamic therapy, or topical applications of 5-fluorouracil (5-FU), diclofenac, peroxicam, trichloroacetic acid, various alpha- and beta-hydroxy acids, imiquimod, ingenol mebutate, and turbanibulin.

EXAMPLES

As described previously in the compositions and methods of treatment and prevention of actinic keratosis, topical treatment of the Aks with the compositions of the embodiment are virucidal to HPV and thereby eradicate HPV infections of Aks. This HPV antiviral activity of the compounds of the embodiment both eliminates or clears the existing AK lesions and prevents the recurrence of the treated AK lesion.

A 2020 publication showed the results of a study to identify papillomaviruses in actinic keratosis and healthy skin of the same immunocompetent individuals. The publication identified a large number of known and novel beta and gamma papillomavirus types and evidence that the gamma-1 types of HPV are enriched in Aks versus healthy skin. The Gammapapillomavirus genus contains 27 species that are known to cause warts and papillomas [Reference: Galati, L., Brancaccio, R. N., Robitaille, A., Cuenin, C., Luzi, F., Fiorucci, G, . . . & Tommasino, M. (2020). Detection of human papillomaviruses in paired healthy skin and actinic keratosis by next generation sequencing. *Papillomavirus Research*, 9, 100196].

Low-risk strain (HPV-11) and high-risk strains (HPV 18 & HPV 31) were tested as surrogates to the gammapapilloma strains to determine antiviral activity of the copper chlorins and copper chlorin complexes.

The in vitro HPV antiviral activity of selected copper chlorin compounds of the embodiment is summarized in several test examples below:

Example 1—In Vitro Tests for HPV-11, HPV-18, and HPV-31

In the first example, the antiviral performance of several copper chlorins was evaluated by in vitro testing against several strains of human papillomavirus. Table 1 shows the results of in vitro antiviral testing against HPV-11 for (1) an aqueous solution of sodium copper chlorin e6; (2) an aqueous solution of sodium copper isochlorin e4; (3) an aqueous solution of sodium copper rhodin g7; and (4) an aqueous solution of sodium copper chlorin p6, as well as (5) an aqueous solution of a positive control, using 9-[2-(phosphono-methoxy)-ethyl]guanine. The chlorins in Example 1 may be included in various formulations of a treatment composition according to the disclosure.

The in vitro testing of the chlorin compounds and the positive control for antiviral cytopathic effect (CPE) was conducted through The National Institute of Allergy and Infectious Diseases (NIAID) NCEA Program. The in vitro testing was done by the method described by Beadle J R, Valiaeva N, Yang G, Yu J H, Broker T R, Aldern K A, et al. Synthesis and Antiviral Evaluation of Octadecyloxyethyl Benzyl 9-[(2-Phosphonomethoxy)ethyl]guanine (ODE-Bn-PMEG), a Potent Inhibitor of Transient HPV DNA Amplification. J Med Chem. 2016; 59(23):10470-8. PubMed PMID: 27933957. This method uses an HPV-11 replicon assay. The replicon (pMP619) is transfected into C-33 A cells grown as monolayers in 384-well plates. At 48 hours post transfection, the enzymatic activity of the destabilized NanoLuc reporter is assessed with NanoGlo reagent. The reference (or control) compound for this assay is 9-[2-(phosphono-methoxy)-ethyl]guanine (PMEG) which has an EC50 value within the range of 2-9.2 µM. The host C-33 A cells are epithelial cells originally isolated from the cervix of a 66-year-old, White, uterine cancer patient. For reasons previously mentioned in this application, in vitro testing of compounds for potential antiviral activity against HPV strains cannot use human keratinocytes as the host cells due to the variable HPV replication activity with this cell line.

The control compound, PMEG, has a molecular weight of 289.188 g/mol. The molecular weight of the copper chlorin compounds evaluated are (1) 661.5 g/mol for disodium copper isochlorin e4; (2) 710.5 g/mol for trisodium copper chlorin p6; (3) 724.15 g/mol for trisodium copper chlorin e6; and (4) 740 g/mol for trisodium copper rhodin g7. The antiviral test results in Table 1 for each treatment composition and the control are reported in micromoles (uM) for the EC50, EC90, and CC50. The SI 50 and SI 90 are calculated from the EC50, EC90, and CC50 data.

The EC50 (or Effective Concentration 50) is the concentration of the test compound in micromoles that reduces virus replication by 50%. The EC90 (or Effective Concentration 90) is the concentration of the test compound in micromoles that reduces virus replication by 90%. CC50 (or Cytotoxic Concentration 50) is the concentration of the test compound in micromoles that reduces the cell viability of the virus host cell by 50%. The SI50 (or Selectivity Index 50) is a measure of both safety and efficacy or therapeutic index and is calculated by dividing the CC50 by the EC50. The SI90 (Selectivity Index 90) is calculated by dividing the CC50 by the EC90.

It is desirable to have a high therapeutic index giving maximum antiviral activity with minimal cell toxicity. Compounds with a Selectivity Index (SI50) values ≥10 are considered to be active in vitro. The United States National Institute of Health (NIH) has rated antiviral compounds for potential efficacy based on the SI50. For example, in assessing high-thruput screening of 100,000 compounds for activity against Influenza A virus (H3N2), NIH set the Selectivity index (SI50) limits to identify promising antiviral compounds as follows: SI50<4, not active; SI50=4-9, slightly active; SI50=10-49, moderately active; SI50>50 highly active.

The EC50 values for the copper chlorin compounds evaluated in Table 1 range from 2.76 µM for trisodium copper chlorin e6 to 5.51 µM for trisodium copper chlorin p6; all within the range reported for the PMEG positive control. Based on the molecular weight of trisodium copper chlorin e6 (724.15) and trisodium copper chlorin p6 (710.5), the EC50 of the copper chlorin compounds can also be expressed in micrograms per gram (µg/g) or micrograms per milliliter (µg/mL) or milligrams per milliliter (mg/mL) or in parts per million (ppm). For example, the trisodium copper chlorin e6 with a molecular weight of 724.15 was shown to have an EC50 of 2.76 µM which can be converted from micromoles to 1.998 µg/g or 1.998 µg/mL.

Based on the in vitro SI50 results listed in Table 1, the HPV-11 antiviral activity of all the listed copper chlorins would be ranked and predicted as "moderately active" against HPV-11 based on published NIH criteria, with trisodium copper rhodin g7 being more active than trisodium copper chlorin e6, which is more active than disodium copper isochlorin e4, which is more active than trisodium copper chlorin p6.

TABLE 1

In vitro Test Results Against HPV-11
In Vitro Test Results for Copper Chlorin Compounds
Activity against HPV-11 (HE611260.1 strain)

| Test Chlorin | EC50 (uM) | EC90 (uM) | CC50 (uM) | SI50 | SI90 | Host Cell Line |
|---|---|---|---|---|---|---|
| Trisodium copper chlorin e6 | 2.76 | 24.91 | 76.17 | 28 | 3 | C-33A |
| Disodium copper isochlorin e4 | 4.63 | 20.56 | 79.77 | 17 | 4 | C-33A |
| Trisodium copper chlorin p6 | 5.51 | 23.63 | 58.39 | 11 | 2 | C-33A |
| Trisodium copper rhodin g7 | 4.48 | 58.77 | >150 | >33 | >3 | C-33A |
| Test Control; 9-[2-(phosphono-methoxy)-ethyl]guanine | 2.27 | >150.00 | >150.00 | >164 | 1 | C-33A |

Additional in vitro antiviral testing of aqueous solutions of copper chlorins was also conducted against HPV-18 (Table 2) and HPV-31 (Table 3).

The in vitro test method used to assess activity of copper chlorins according to embodiments herein against HPV-18 and HPV-31 used the same replication and quantification method described previously for Table 1 results but with HPV-18 and HPV-31 genome plasmids. Results of the in vitro testing of three of the same copper chlorins as used in Table 1, as well as the same control, against HPV 18 and HPV 31 are summarized in Table 2 and Table 3 below.

Table 2 shows that all three copper chlorins have a high degree of cytotoxicity against both the HPV-18 virus at a similar concentration (EC50) or lower concentration (EC90) than the positive control. The SI50 for the treatment compositions comprising different copper chlorins in this evaluation indicates that, for antiviral activity against HPV-18, the trisodium copper chlorin e6 and the disodium copper isochlorin e4 would be classified as moderately active, while the sodium copper rhodin g7 would be classified as highly active against HPV-18.

Table 3 shows that all three copper chlorins have a high degree of cytotoxicity against the HPV-31 virus at an EC50 and EC90 concentration lower than the positive control. The SI50 for the different copper chlorins in this evaluation indicates that, for antiviral activity against HPV-31, the trisodium copper chlorin e6 would be classified as moderately active while the disodium copper chlorin e4 and the sodium copper rhodin g7 would be classified as highly active against HPV-31.

TABLE 2

In Vitro Test Results Against HPV-18
In Vitro Test Results for Copper Chlorin Compounds
Activity against HPV-18 (strain: KC470230.1)

| Test Chlorin | EC50 (uM) | EC90 (uM) | CC50 (uM) | SI50 | SI90 | Host Cell Line |
|---|---|---|---|---|---|---|
| Trisodium copper chlorin e6 | 1.42 | 2.97 | 53.91 | 38 | 18 | C-33A |
| Disodium copper isochlorin e4 | 3.20 | 6.09 | 51.53 | 16 | 8 | C-33A |
| Trisodium copper rhodin g7 | 1.19 | 2.62 | 233.74 | 196 | 89 | C-33A |
| Test Control: 9-[2-(phosphonomethoxy)-ethyl]guanine | 2.33 | 21.28 | >250.00 | >107 | >12 | C-33A |

TABLE 3

In Vitro Test Results Against HPV-31
In Vitro Test Results for Copper Chlorin Compounds
Activity against HPV-31 (strain: HQ53768.1)

| Test Chlorin | EC50 (uM) | EC90 (uM) | CC50 (uM) | SI 50 | SI90 | Host Cell Line |
|---|---|---|---|---|---|---|
| Trisodium copper chlorin e6 | 1.75 | 3.8 | 47.72 | 27 | 13 | C-33A |
| Disodium copper isochlorin e4 | 0.25 | 4.45 | 51.38 | 206 | 12 | C-33A |
| Trisodium copper rhodin g7 | 0.36 | 1.62 | 227.45 | 632 | 140 | C-33A |
| Test Control: 9-[2-(phosphonomethoxy)-ethyl]guanine | 3.92 | 18.40 | >250.00 | >64 | >14 | C-33A |

Actinic Keratosis Clinical Treatment & Evaluation

Evaluation of a treatment composition comprising a copper chlorin for treating AKs was medically conducted by a dermatologist with decades of experience in treating pre-cancerous skin lesions. Diagnosis of the AKs was made based on patient presentation, patient treatment history, and physician clinical diagnosis using the Olsen actinic keratosis grading scale. Clearance of the AK was determined by a combination of clinical visual assessments and microscopy via Dermatoscope for the patient case studies. The patient treatment examples described used a treatment composition within the scope of some embodiments herein as described in either Table 4 or Table 5:

TABLE 4

Actinic Keratosis Treatment Solution; Formula PB-01-068

| Raw Material Ingredient | Percent by Weight in Example | Preferred Range; % by weight |
|---|---|---|
| Dimethyl isosorbide (DMI; Croda) | 15.0 | 5-25 |
| Transcutol ® P (diethylene glycol monoethyl ether; Gattefosse') | 20.0 | 10-40 |
| Natrosol 250HX Pharma | 0.25 | 0.1-1.2 |
| (Hydroxyethylcellulose; Ashland Specialty Chemcial) | | |
| Phenoxyethanol | 0.50 | 0.2-1.0 |
| Trisodium Copper Chlorin e6 (Frontier Chemical Specialties; Lot WJ23-00123) | 0.05 | 0.01-0.1 |
| Deionized water | 64.20 | 50-80 |
| Total | 100.00 | |

TABLE 5

Actinic Keratosis Treatment Gel; Formula PB-01-073

| Raw Material Ingredient | Percent by weight in Example | Preferred Range; % by weight |
|---|---|---|
| Dimethyl isosorbide (DMI; Croda) | 5.0 | 2.5-25 |
| Transcutol ® P (diethylene glycol monoethyl ether; Gattefosse') | 10.0 | 5.0-40 |
| EasyGel DO (Carbomer 940; 3V Sigma) | 1.20 | 0.5-1.5 |
| Phenoxyethanol | 0.80 | 0.5-1.0 |
| Trisodium Copper Chlorin e6; 91% (Frontier Chemical Specialties; lot WJ23-00123 | 0.05 | 0.01-0.1 |
| Sodium Hydroxide, 25% solution | 1.90 | 1.5-2.5 |
| Ascorbic Acid | 0.01 | 0.005-0.1 |
| Deionized Water | 81.04 | 50-90 |
| Total | 100.00 | |

Example 2—Treatment of Patient AK001 with PB-01-068

Patient AK001 applied 1-1.5 mL of formula PB-01-068 copper chlorin solution to several AK lesions on the frontotemporal area of the scalp and immediate surrounding skin area of the scalp once daily for 7 days. Inspection of the scalp at the end of 7 days of treatment showed elimination of the Aks hyperkeratotic tissue. No photographs were taken.

Example 3—Treatment of Patient AK002 with PB-01-073

Patient AK002 applied a small size pea (about 0.15 g) of gel formula PB-01-073 to a target AK lesion on the back of the scalp once daily for 11 days. At the end of 11 days, there was no palpable detection of the hyperkeratotic AK lesion and the initial redness and raised AK lesion was smooth and cleared.

FIG. 1a is a baseline photo of the target AK lesion prior to treatment.

FIG. 1b is a photo of the lesion at the end of the 11-day treatment.

Example 4—Treatment of Patient AK003 with PB-01-073

Patient AK003 applied a small size pea (about 0.15 g) of gel formula PB-01-073 to a target AK lesion on the scalp once daily for 11 days. At the end of 11 days, there was no palpable detection of the hyperkeratotic AK lesion and the initial redness and raised AK lesion was smooth and cleared.

FIG. 2a is a baseline photo of the target AK lesion prior to treatment.

FIG. 2b is a photo of the lesion at the end of the 11-day treatment.

Example 5—Pilot Clinical Study of Copper Chlorin Formula PB-01-074

In one embodiment, a proof-of-concept pilot clinical study was conducted to evaluate the safety and efficacy of chlorins for the treatment of AKs. This clinical study evaluated the topical use of formula PB-01-074 (Table 6) for the treatment of single targeted Olsen grade I-III actinic keratoses on the face or scalp of qualified human patients.

TABLE 6

Actinic Keratosis Treatment Gel; Formula PB-01-074

| Raw Material Ingredient | Percent by weight in Example 5 | Preferred Range; % by weight |
|---|---|---|
| Dimethyl isosorbide (DMI; Croda) | 5.0 | 2.5-25 |
| Transcutol ® P (diethylene glycol monoethyl ether; Gattefosse') | 10.0 | 5-40 |
| EasyGel DO (Carbomer 940; 3V Sigma) | 1.00 | 0.5-1.5 |
| Phenoxyethanol | 0.80 | 0.5-1.0 |
| Trisodium Copper Chlorin e6; 91% (Frontier Chemical Specialties; lot WJ23-00123) | 0.05 | 0.01-0.1 |
| Sodium Hydroxide, 25% solution | 1.50 | 1.0-4.0 |
| Ascorbic Acid | 0.01 | 0.005-0.1 |
| Deionized Water | 81.64 | 50-90 |
| Total | 100.00 | |

The primary objective of the proof-of-concept pilot clinical study was to determine total AK lesion clearance rate defined as the percentage of the treated patients with total clearance (100% lesion clearance) and with partial clearance (>75% lesion clearance) after a) daily treatment of the target lesion for 14 days with treatment product PB-01-074 (Table 6). The secondary objective of the proof-of-concept pilot clinical study was to determine a) AK recurrence rates for the treated AKs at 8 and 24 weeks after the end of treatment and b) to determine the Human Papilloma Virus (HPV) content of the target AK at baseline prior to treatment and at 8 and 24 weeks post treatment for any recurring AK.

Adult male and female patients, in good health or with a stable medical condition were included in the proof-of-concept pilot study and were required to meet inclusion and exclusion criteria and review and sign an informed consent. Chief among the inclusion requirements were criteria for including patients that: had lighter skin tones (Fitzpatrick types I-III); presence of a treatable AK on the face or scalp (excluding ear and eye areas); no prior use of other AK treatments in the previous 60 days before the study; no use of any drug or cosmetic treatment product on the target AK during the study; willing to avoid sun exposure, tanning beds and use sun protective clothing or use a broad-spectrum sunscreen during the study; and, willing and able to comply with the treatment use instructions and clinical and photographic assessment schedule.

Chief among the exclusion criteria for the pilot study were exclusion of: pregnant patients and female patients of childbearing age not using birth control; patients with a history of autoimmune disease; patients with a skin condition in addition to AKs requiring medical treatment; patients with skin damage around the areas of AK treatment; patients with a history of malignancy or skin cancer; and, patients with a history of any systemic disease that might affect the treatment.

Treatment of the PB-01-074 (Table 6) copper chlorin gel during the POC pilot study was self-applied by the patients who were instructed to apply a small pea size amount of the gel product to the AK lesion and the immediate surrounding skin area, The small pea size amount applied was estimated at 0.025-0.20 g of PB-01-074 containing 12.5-100 ug of trisodium copper chlorin e6. The clinical patients were instructed to apply the PB-01-074 gel in the evening by first wiping the treatment area with an alcohol swab and allowing the treatment area to dry, followed by gently rubbing the small pea sized blue-green gel into the target lesion and surrounding skin until the blue-green color disappeared into the skin. Patients were advised to allow the applied test product to dry for 15 minutes before resuming normal activity to avoid any product transfer to clothing. The patients were also advised to not wash the treated area for a minimum of 8 hours from the time of application of the PB-01-074.

Table 7 summarizes the clinical schedule of events for the pilot POC study that were required for patients treated with the PB-01-074 gel formula. The study was designed to have a total of 15 qualified patients completing the study.

TABLE 7

Schedule of Events; Pilot POC Study; PB-01-074
Proof of Concept Study; Topical Treatment of AK with PB-01-074 Treatment Gel
Schedule of Maintenance and Events

| | ICF | Photos AK Target | Skin Scraping HPV Analysis | Dispense Single Tube PB-01-074 | Clinical Evaluation AK Target Area | Review Medical * Product Use History Per Criteria for Study Inclusion | Review Concomitant Medication | Assess for Adverse Events |
|---|---|---|---|---|---|---|---|---|
| Pre-Study Screening Visit | √ | √ | √ | | √ | √ | √ | |
| Initial Treatment Visit | | | | √ | √ | √ | √ | √ |

TABLE 7-continued

Schedule of Events; Pilot POC Study; PB-01-074
Proof of Concept Study; Topical Treatment of AK with PB-01-074 Treatment Gel
Schedule of Maintenance and Events

| | ICF | Photos AK Target | Skin Scraping HPV Analysis | Dispense Single Tube PB-01-074 | Clinical Evaluation AK Target Area | Review Medical * Product Use History Per Criteria for Study Inclusion | Review Concomitant Medication | Assess for Adverse Events |
|---|---|---|---|---|---|---|---|---|
| Day 1 (VISIT 1) | | | | | | | | |
| Day 15 (VISIT 2) | | √ | √ | | √ | √ | √ | √ |
| Day 30 (VISIT 3) | | √ | √ | | √ | | | |
| Week 10 (Visit 4) | | √ | √ | | √ | | | |
| Week 26 (VISIT 5) | | √ | √ | | √ | | | |

The pre-study screening visit of the Proof of Concept study (Table 7) was conducted to evaluate the patient for possible enrollment in the study based on the study inclusion and exclusion criteria, clinical assessment for the presence of an Olsen grade I-III AK on the face or scalp, acceptable medical history for the patient, and, if the patient qualified, to have the patient read and sign the Informed Consent Form (ICF).

Visit 1 is combined with the pre-study screening visit if all pre-study criteria are met and baseline digital high-resolution photographs of the AK lesion were taken and a tube of the PB-01-074 gel was dispensed together with a broad-spectrum SPF 30 sunscreen to the patient for daily application for 14 consecutive days as directed. The sunscreen is used as needed prior to sun exposure. Typically, the PB-01-074 topical gel was applied to the target AK lesion in the evening and the sunscreen was applied over the AK skin area during the day as needed. Patients were cautioned to not wash the skin area treated with PB-01-074 topical gel for at least 8 hours following application. Additionally, at Visit 1, a surface skin scraping sample of the patient's AK target lesion is collected and stored at −20 C for post-study analysis.

On Visits 2 (Day 15; +2/−0 days) and Visit 3 (Day 30, +/−2 days) of the POC study, the patients were interviewed for any adverse events and any signs of cutaneous irritation of the target AK and surrounding skin area. The use of no concurrent topical treatments on the face or scalp was confirmed and clinical grading of the target AK lesion according to the Olsen scale was conducted. Additionally, high resolution, clinically relevant, macroview digital photographs of the target AK site were taken and a skin scraping sample of any residual AK lesion still remaining post treatment at Visit 3 was collected and stored at −20 C for post-study analysis. Any residual AK lesion not resolved and remaining after sampling at Visit 3 was treated with cryotherapy.

On Visit 4 (10 weeks from baseline Day 1; +/−5 days) and Visit 5 (26 weeks from baseline Day 1; +/−5 days) clinical examination was conducted to determine recurrence of any AK lesion. Any reoccurring AK lesion was treated with cryotherapy.

The results for treatment of the patients who completed the two-week treatment with PB-01-074 (Visit 2) as well as follow-up examination on Visit 3 at one month, per the protocol described above, are shown in Table 8 below:

TABLE 8

AK Clinical Study Results; PB-01-074

| Patient | Age | Olsen Grade | Visit 2 Clearance Rate | Visit 3 Clearance Rate | Cryo Performed | Visit 2 AEs | Visit 3 AEs |
|---|---|---|---|---|---|---|---|
| AK-001 | 71 | II | P | C | N | N E0, P0, D0, I0, BS0 | N E0, P0, D0, I0, BS0 |
| AK-002 | 72 | II | L | P | Y | N E0, P0, D0, I0, BS0 | Disqualified after visit 3-protocol violation |
| AK-003 | 75 | II | P | C | N | Y E0, P0, D0, I1, BS0 | N E0, P0, D0, I0, BS0 |
| AK-004 | 77 | II | L | C | Y | N E0, P0, D0, I0, BS0 | N E0, P0, D0, I0, BS0 |
| AK-005 | 64 | II | C | N/A | N | N E0, P0, D0, I0, BS0 | Disqualified-missed visit |
| AK-006 | 90 | II | C | N/A | N | N E0, P0, D0, I0, BS0 | Patient disqualified: hospitalized for extended periods of time |
| AK-007 | 56 | I | C | C | N | N E0, P0, D0, I0, BS0 | N E0, P0, D0, I0, BS0 |

TABLE 8-continued

AK Clinical Study Results; PB-01-074

| Patient | Age | Olsen Grade | Visit 2 Clearance Rate | Visit 3 Clearance Rate | Cryo Performed | Visit 2 AEs | Visit 3 AEs |
|---|---|---|---|---|---|---|---|
| AK-008 | 72 | III | L | P | Y | Y E0, P2, D3, I3-4, BS1 | Y E0, P1, D0, I1, BS0 |
| AK-009 | 78 | II | P | P | Y | N E0, P0, D0, I0, BS0 | N E0, P0, D0, I0, BS0 |
| AK-010 | 67 | II | P | P | Y | N E0, P0, D0, I0, BS0 | N E0, P0, D0, I0, BS0 |
| AK-011 | 74 | II | P | C | N | N E0, P0, D0, I0, BS0 | N E0, P0, D0, I0, BS0 |
| AK-012 | 80 | III | L | P | Y | N E0, P0, D0, I0, BS0 | Y E0, P1, D0, I0, BS0 |
| AK-013 | 67 | II | C | C | N | Y E0, P1, D2, I0, BS2 | N E0, P0, D0, I0, BS0 |
| AK-014 | 56 | II | C | C | N | N E0, P0, D0, I0, BS0 | N E0, P0, D0, I0, BS0 |
| AK-015 | 86 | II | C | C | N | N E0, P0, D0, I0, BS0 | N E0, P0, D0, I0, BS0 |

Keys to Table 8 Abbreviations

Olsen Grade (I-III); Face (F) or Scalp (S); Complete Clearance (C); Partial Clearance (P); Less than 75% Clearance (L).

Adverse Events (AEs) Keys: Grades 0-4 for Erythema (E), Peeling (P), Dryness (D), Itching (I), and Burning/Stinging (B/S).

At visit 2 (day 15), after 14 days of daily treatment with PB-01-074, 11 of 15 patients had AK clearance (73.3%) with 6 of the 11 patients graded as 100% clearance and 5 of the 11 graded as partial (>75%) clearance. At visit 3 (Day 30; −0/+2 days), the patients were again examined for clearance and any signs of irritation. Three of the 15 patients were eliminated from the grading at visit 3 due to missed visit 3 (patient 005 & 006) or for treatment protocol violation (patient 003). For the remaining 12 patients completing visit 3 grading, 12 of 12 patients (100%) had AK clearance with 7/12 showing complete (100%) clearance and 5/12 showing partial (>75%) clearance. The results indicate that full clearance can be achieved within two weeks of daily treatment but clinical assessment should be conducted at least two weeks after the end of treatment with the treatment composition of Table 6 to allow for complete exfoliation of residual AK lesions.

Assessment of cutaneous adverse events was made and recorded at patients' visits 2 and 3 as shown on Table 8. All patients were graded as showing no treatment-related inflammatory response (erythema grade 0) at visit 2 or 3.

A sustained grade 1-4 erythematous response with pain, swelling, peeling, and erosion is a common side effect for the treatment of AKs with the current FDA approved treatments that include topical 5-flourouracil, imiquimod, turbanibulin, ingenol mebutate, photodynamic therapy with aminolevulinic acid or methyl aminolevulinic acid, and liquid nitrogen cryosurgery. The PB-01-074 pilot P00 clinical results indicate that clearance of AKs is achievable without cytotoxic inflammation.

The AEs (adverse events) for patients at visit 2 recorded no AEs of any kind for 12 of the 15 patients assessed. One patient complained of minor (grade 1) itching; one patient complained of dryness (grade 2), peeling (grade 1) and application burning/stinging (grade 2) and a third patient complained of peeling (grade 2), dryness (grade 3), itching (grade 3-4) and burning/stinging (grade 1). All AEs were resolved by visit 3 except for one patient with mild (grade 1) itching.

In another embodiment of the invention, a hydroalcoholic solution of trisodium copper chlorin e6 for treatment of AKs was formulated as described in Table 9.

TABLE 9

Formula PB-01-078

| Phase | Ingredient | % w/w In Example | Preferred Range; % by weight |
|---|---|---|---|
| A | Diethylene Glycol Monoethyl Ether (Transcutol ® P) | 10.00 | 5-40 |
| | Dimethyisosorbide | 5.00 | 2.5-15 |
| | Alcohol, 200 proof, 40B | 20.00 | 0-30 |
| | Phenoxyethanol | 0.50 | 0.1-1.0 |
| B | Deionized Water | 55.00 | 40-70 |
| | Sodium Lactate solution, 60% | 5.00 | 1-10 |
| | Sodium Hydroxide Solution, 25% | q.s. | 0.05-0.5 |
| | Ascorbic Acid | 0.10 | 0.01-0.25 |
| | Trisodium Copper Chlorin e6 | 0.05 | 0.01-0.1 |
| C | Sodium Hydroxide Solution, 25% | q.s. | 0.5-4.0 |
| | Citric Acid | q.s. | 0.01-.25 |
| | Deionized Water | q.s. a.d. | 0.5-10 |
| | | 100.00 | |

Formula PB-01-078 was made as follows: Add Phase A ingredients together at 20-25 degrees C. and mix until uniform while avoiding evaporation. In a separate batching vessel, dissolve the ascorbic acid in the deionized water with mixing at 20-25 degrees C. until fully dissolved. Add the sodium lactate solution to the Phase B vessel at 20-25 degrees C. and mix until clear and uniform. Add sufficient amount of sodium hydroxide solution with mixing to the water-ascorbic acid-sodium lactate mixture at 20-25 degrees C. to raise the pH to between 7.0-8.0. Add the trisodium copper chlorin e6 at 20-25 degrees C. to the Phase B mixture and mix until fully dissolved. Add the contents of the Phase B vessel to Phase A vessel at 20-25 degrees C. with mixing until uniform while avoiding evaporation. Add additional deionized water of approximately 4% of total batch weight to the Phase A+B mixture to reach a total of 99.65% of theoretical batch weight and mix at 20-25 degrees C. until uniform. Add a sufficient amount of sodium hydroxide solution and citric acid at 20-25 degrees C. with mixing to adjust the pH of the mixture to a pH of 8.2-8.6 with a target pH of 8.4. If necessary, add additional deionized water with mixing at 20-25 degrees C. to the mixture to bring the total batch amount to 100% of the batch weight.

In another embodiment, formula PB-01-078 was used to treat single and multiple actinic keratosis lesions by topically applying the PB-01-078 solution directly to the AK lesion and surrounding skin with a cotton or synthetic fiber swab applicator.

In another embodiment, the PB-01-078 solution was filled into a hermetically sealed glass ampoule within a butyrate plastic tube and further covered with a cardboard sleeve wherein the plastic tube is closed at one end and the other end contains a polyolefin fiber swab applicator tip as described for single use glass ampoule swab applicators manufactured by James Alexander Corporation of Blairstown, N.J. When used for treating one or more AK lesions, the exterior cardboard sleeve of the applicator device is squeezed to break the internal glass ampoule allowing the solution of PB-01-078 to flow into the polyolefin swab tip.

In another embodiment, formula PB-01-078 is filled into single use plastic ampoule or plastic unit dose applicators with fibrous swab or foam applicator tips and used to treat single and multiple actinic keratosis lesions by topically applying the PB-01-078 solution directly to the AK lesion and surrounding skin.

Transcriptome Study

Antiviral activity of copper chlorin for treatment and/or prevention of actinic keratosis was also identified by an analysis of gene regulatory activity of human keratinocytes by copper chlorins, specifically sodium copper chlorophyllin complex, disodium copper isochlorin e4, trisodium copper chlorin p6, and trisodium copper chlorin e6.

A transcriptome analysis of gene regulatory activity of human skin cells by each of sodium copper chlorophyllin complex, disodium copper isochlorin e4, trisodium copper chlorin p6, and trisodium copper chlorin e6 identified key biomarkers, molecular pathways, and possible mechanism of action associated with the topical human use of one or more of the compounds in the treatment of actinic keratosis. "Biomarkers" are molecular entities which can be detected in a biological sample (from a human subject) that are useful in diagnosing and evaluating response to a treatment. Biomarkers include, but are not limited to, DNA, RNA mRNA, and proteins. For purposes of the present disclosure, a change of 2-fold (200%) or more in the "expression level" of a biomarker ("expressed genes") is considered "significant expression level" refers to the amount of a polynucleotide or an amino acid product or protein in a biological sample. "Expressed genes" include those that are transcribed into an RNA and then translated into a protein, as well as those that are transcribed into RNA (mRNA) but not translated into a protein (e.g., transfer and ribosomal RNAs).

In the context of the present disclosure, expression of biomarkers can be detected on levels of mRNA or protein. mRNA can be assessed using well-established methodologies known to the skilled artisan, including PCR (including qRT-PCR, RT-PCR), and cDNA micro-array chip (e.g., "GeneChip" from Affymetrix or the equivalent). Protein levels can be detected using quantification techniques known to the skilled artisan including enzyme-linked immunosorbent assay (ELISA); electrochemical illuminescence via mesoscale discovery (MSD); Western-blot; mass spectrometry; Biacore® which can measure antibody-antigen interactions, protein-protein interactions, and protein-DNA interactions.

Probes/detecting agents for detecting biomarkers are known in the art and include oligonucleotide probes/primers, micro-array chip probes, and antibodies specific for the markers. Gene expression microarrays are increasingly used in clinical research to establish biomarker signatures.

The transcriptome study of copper chlorins was conducted by Sunny Biodiscovery laboratory and Thermo-Fisher Scientific Microarray Research Services Laboratory, both of Santa Clara, California to determine gene regulatory activity and biomarkers associated with activity of the copper chlorins on human skin by assessing gene expression from keratinocyte culture after 24-hour exposure of each of the copper chlorins as previously detailed in U.S. Provisional Application Ser. No. 63/233,229 (filed on Aug. 14, 2021). As described in the '229 Application, the method used to generate a full transcriptome profile and analysis of genes significantly regulated by each of copper chlorins evaluated is detailed as follows:

Human neonatal epidermal keratinocytes (HEKn) were obtained from Cell Applications 5 (San Diego, CA) and were plated in a 96 well plate (Bioland Scientific, Paramount, CA, item #701003 made of high clarity polystyrene) with keratinocyte growth media (Human EpiVita Serum-Free Growth Medium for Neonatal Cells; Cell Applications, San Diego, CA). Cells were mixed with growth media at a rate of 10,000 cells per 200 µl (approximately 104 cells per well) and added to the 96 wells (0.2 mL/well) and incubated overnight at 37° C.

Following the overnight incubation of keratinocytes, each of the 4 copper chlorins evaluated was separately dissolved in sterile distilled water at a concentration of 20 mg/mL. Dissolution occurs at 20-25° C. with slight agitation for 1-2 minutes until no solid particles were visible. This stock solution of 20 mg/mL was then further diluted with sterile water to a concentration of 500 µg/mL. The 500 µg/mL solution of each test copper chlorin was added to the cells in the growth media at a ratio of 1:20 (test solution: cells & media) and incubated in the wells for 24 hours at 37° C. The four test treatment compounds evaluated are listed in Table 10 below.

TABLE 10

Transcriptome Study Copper Chlorins

| Treatment Composition Test Material | Lot number | Abbreviation |
| --- | --- | --- |
| Biocolor Green C4 NB5637 (Sodium Copper Chlorophyllin Complex; FMC Corp, Centrum 100, Burton upon Trent DE14 2WD UK) | SR-013738 | Biocolor C4 |
| Disodium Copper (II) Isochlorin e4 (Frontier Scientific, Logan, UT) | DC19-12923 | Chlorin e4 |
| Trisodium Copper (II) Chlorin e6 (Frontier Scientific, Logan, UT) | RP14-8608 | Chlorin e6 |
| Trisodium Copper (II) Chlorin p6 (Frontier Scientific, Logan, UT) | DC19-12924 | Chlorin p6 |

The following day the test solution and growth media were removed from the wells and the cells were rinsed with phosphate-buffered saline (PBS). The RNA from the cells treated with each of the test compounds was extracted and purified with a RNeasy Mini Plus Kit (Catalogue #74134; Qiagen, Germantown, MD) with automated lysing and homogenization using a Qiacube Connect robotic station (Qiagen, Germantown, MD). The protocol for RNA extraction is selected on the Qiacube Connect automated station and cell samples, labware, and reagents are loaded as instructed. Cells are first lysed and homogenized in highly denaturing guanidine-isothiocyanate-containing Buffer RLT Plus, which immediately inactivates RNases to ensure isolation of intact RNA. The lysate is passed through Qiacube Connect loaded gDNA Eliminator spin columns, 15 ethanol is added to the flow-through, and the samples are then applied to Qiacube preloaded RNeasy MinElute spin columns. RNA binds to the membrane and contaminants are washed away. High quality RNA is eluted and collected in a total of 30 µL sterile distilled water.

Figure 4:
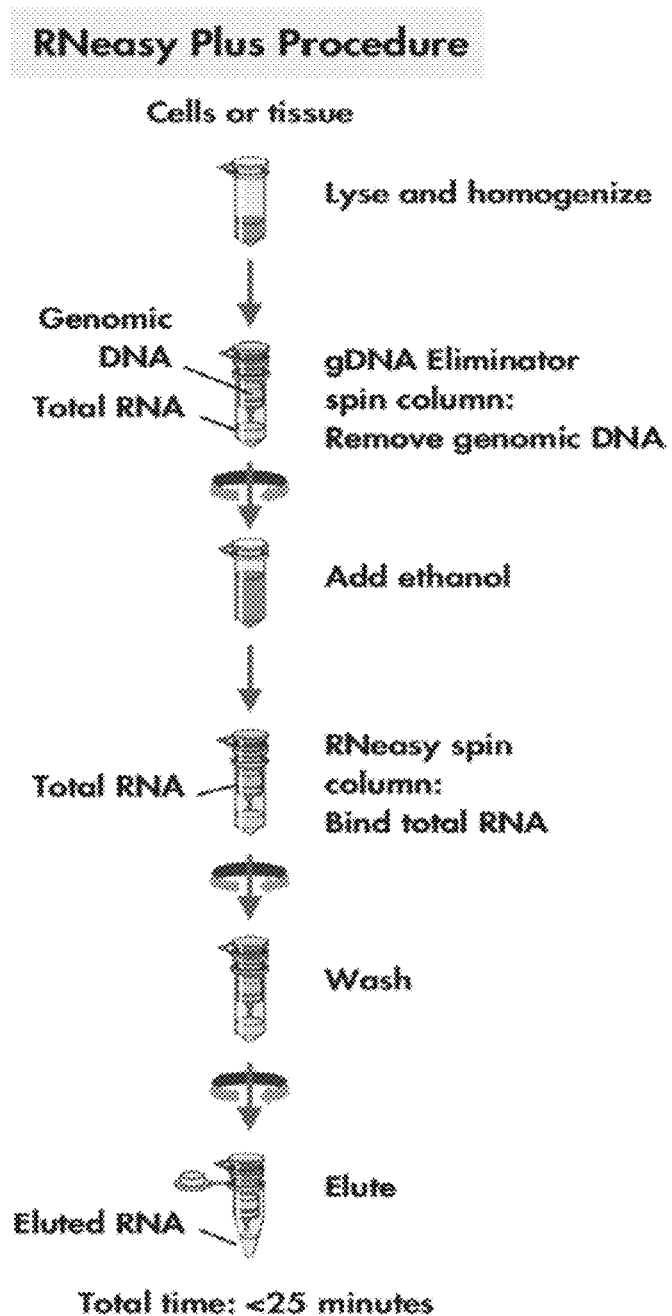
FIG. 4 is a Stepwise procedure for production of RNA using RNeasy Plus.

The stepwise procedure for production of RNA using RNeasy Plus procedure is outlined FIG. 4. Once collected, the purity of the RNA is assessed with the NanoDrop Lite spectrophotometer (Thermo Fisher Scientific, Waltham, MA) at 260 nm and 280 nm. The NanoDrop Lite unit is a small, stand-alone UV spectrophotometer that is designed 5 to measure microvolumes (1-2 µL) of nucleic acid and protein samples. Purity of the collected RNA was verified by adding 1 µL of the collected RNA to the NanoDrop Lite unit, selecting the RNA application on the NanoDrop Lite Home screen and following the stepwise measuring procedure as detailed in the NanoDrop Lite Manual. The sample purity is displayed by the NanoDrop Lite screen based on the A260/A280 ratio.

The extracted RNA for each of the four treatment compositions evaluated from the above procedure was then transported on dry ice to a laboratory specializing in transcriptome analysis (Thermo Fisher Scientific Microarray Research Services Laboratory, Santa Clara, CA). The transcriptome profiling of the RNA samples was conducted using the Clariom S GeneChip® Pico Assay platform. The resulting CHP files containing probe set analysis results generated with Affymetrix® software were uploaded and differential gene expression, as well as functional interaction networks were analyzed with Summarization SST-RMA algorithm using the Affymetrix TAC® (Transcriptome Analysis Console) software version 4.0.2. (Applied Biosystems by Thermo Fisher).

The Human Clariom S Assay design provides extensive coverage of all known well-annotated genes and accurately measures gene-level expression from >20,000 well-annotated genes and can utilize RNA from various sample types including blood, cells, and fresh/fresh-frozen or FFPE tissues. Human Clariom S Assays detect only the exons present in all known transcript isoforms expressed from a single gene locus-constitutive exon. This differs from other gene-level array technologies and shallow RNA-Seq, which provide either a biased view of gene expression or data that are complicated by variation in expression of transcript variants. By detecting only constitutive exons throughout the length of each known gene, Human Clariom S Assays generate the most accurate and truest measurement of gene-level expression. Clariom S solutions are formats for single-sample (cartridge array) processing on the GeneChip™ 3000 instrument system or the fully automated GeneTitan® instrument (Thermo Fisher).

Excel® spreadsheets and CHP and CEL files of genes affected by each treatment composition in Table 10 were generated by Thermo Fisher Microarray Research Services Laboratory based on the above process. The CHP or CEL files generated by Thermo Fisher were then imported into the TAC® software console to identify genes significantly downregulated (folding of −2.0 or less) or genes significantly upregulated (folding of +2.0 or more) by the treatment compositions in Table 10 above.

The TAC software analysis of differentially expressed genes compared the gene regulation of each of the compounds versus the water control and set the software filters to identify only genes that had been significantly upregulated or significantly downregulated with fold change set at greater or equal to 2.0 and p values at less than 0.01 for each significant differential change. Thereafter, a TAC analysis of the key biological pathways for HPV viral infections that were significantly altered by one or more of the treatment compositions in Table 10 were developed. The TAC biomarker analysis uses WikiPathways 15 (https://www.wikipathways.org/index.php/WikiPathway), a source database of biological pathways maintained by and for the scientific community. The significance for the gene regulatory activity induced by one or more of the treatment compositions in Table 10 above for activity against HPV was calculated using a 2×2 contingency in a Fisher's Exact Test (Two Sided). Fisher's Exact Test is a statistical significance test used in the analysis of contingency table(s). After a p-value is established using Fisher's Exact Test (https://assets.thermofisher.com/TFS-25 Assets/LSG/manuals/tac_user_manual.pdf), it is converted to −log 10. The result of this conversion is the Significance number.

Without wishing to be bound by theory and to further identify the biological mechanisms of the unique HPV antiviral and AK treatment activity of the copper chlorin and copper chlorin complex compounds, an analysis of the gene regulation of human keratinocytes by copper chlorin and copper chlorin complex compounds was reviewed for significant regulation of keratinocyte mitosis and differentiation. Table 11 shows genes related to hyperkeratinization that are significantly regulated by the addition of 20 ug/mL of the listed copper chlorins and copper chlorin complexes.

TABLE 11

Key Biomarker Gene Regulation by Copper Chlorins to Reduce Actinic Keratosis Hyperkeratinization

| Gene | Copper chlorin complex regulation (keratinocytes) | Disodium copper Isochlorin e4 regulation (keratinocytes) | Trisodium copper chlorin e6 regulation (keratinocytes) | Trisodium copper chlorin p6 regulation (keratinocytes) |
| --- | --- | --- | --- | --- |
| EPGN Epithelial mitogen | | −3.17 | −2.56 | |
| MAPK14 Mitogen-activated protein kinase 14 | −2.62 | | −2.23 | |
| CDKN1A cyclin-dependent kinase inhibitor 1A (p21, Cip1) | | +2.46 | +2.22 | |
| CYB561 Cytochrome b561 | −4.43 | | −2.28 | |
| UNC5B Unc-5 netrin receptor B (akt-mediated inactivation of p53) | | +8.06 | | +3.59 |
| KDM7A lysine (K)-specific demethylase 7A | | +2.62 | | +2.38 |

It will be appreciated that treatment compositions and/or methods of treating and/or preventing disclosed herein may include one or more of the following examples:

Example 1. A method of treating actinic keratosis comprising applying a treatment composition to an actinic keratosis lesion, wherein the treatment composition comprises a chlorin.

Example 2. The method of example 1 wherein the chlorin comprises a copper chlorin.

Example 3. The method of any one of examples 1-2 wherein the applying the treatment composition comprises topically applying a dose of the treatment composition to the actinic keratosis lesion.

Example 4. The method of example 3 wherein the treatment composition is in a liquid form and the dose is around 0.05 to around 1.0 mL.

Example 5. The method of example 3 wherein the treatment composition is in a solid or semi-solid and the dose is around 0.01 to around 2.0 grams.

Example 6. The method of any one of examples 3-5 wherein the dose comprises around 25 to around 500 μg of the copper chlorin.

Example 7. The method of any one of examples 2-6 wherein the copper chlorin comprises one or more of copper chlorin e6, copper isochlorin e4, copper chlorin p6, copper rhodin g7, or copper chlorophyllin complex.

Example 8. The method of any one of examples 2-6 wherein the copper chlorin comprises a sodium salt of one or more of copper chlorin e6, copper isochlorin e4, copper chlorin p6, copper rhodin g7, or copper chlorophyllin complex.

Example 9. The method of any one of examples 1-8 wherein the treatment composition also comprises one or more sunscreen compounds.

Example 10. The method of any one of examples 1-9 further comprising: diagnosing a patient with actinic keratosis prior to applying the treatment composition.

Example 11. The method of example 10 wherein diagnosing the patient comprises: obtaining a tissue sample from the patient; determining if the patient has actinic keratosis based on an evaluation of the tissue sample by a medical professional.

Example 12. The method of example 11 wherein applying the treatment composition is only carried out if the patient is determined to have actinic keratosis.

Example 13. The method of any one of examples 11-12 wherein the patient is a human patient.

Example 14. The method of example 13 wherein the medical professional is a medical doctor or a nurse practitioner or a physician assistant.

Example 15. The method of any one of examples 11-12 wherein the patient is a canine or a feline.

Example 16. The method of example 15 wherein the medical professional is a veterinary doctor or veterinary assistant.

Example 17. A treatment composition for treating actinic keratosis, the treatment composition comprising a chlorin.

Example 18. The treatment composition of example 17 wherein the chlorin comprises a copper chlorin.

Example 19. The treatment composition of any one of examples 17-18 further comprising a pharmaceutical vehicle suitable for topical application to an actinic keratosis lesion.

Example 20. The treatment composition of any one of examples 17-19 further comprising one or more of a viscosity modifier, a thickener, a PEG glyceryl ester, a skin penetrant, a solvent, a film-forming polymer, an antioxidant, a colorant, a preservative, an emollient, or an opacifier.

Example 21. The treatment composition of example 20 wherein the skin penetrant comprises diethylene glycol monoethyl ether or dimethyl isosorbide or both.

Example 22. The treatment composition of any one of examples 20-21 wherein the solvent comprises water.

Example 23. The treatment composition of any one of examples 20-22 wherein the viscosity modifier comprises hydroxyethylcellulose.

Example 24. The treatment composition of any one of examples 20-23 wherein the preservative comprises phenoxyethanol or phenylethyl alcohol.

Example 25. The treatment composition of any one of examples 18-24 wherein the copper chlorin comprises one or more of copper chlorin e6, copper isochlorin e4, copper chlorin p6, copper rhodin g7, or copper chlorophyllin complex.

Example 26. The treatment composition of any one of examples 18-25 wherein the treatment composition comprises around 0.002% to around 0.1% by weight total of the copper chlorin.

Example 27. The treatment composition of any one of examples 18-26 wherein the copper chlorin comprises trisodium copper chlorin e6.

Example 28. The treatment composition of any one of examples 17-27 further comprising an aqueous or anhydrous pharmaceutical delivery vehicle and wherein the treatment composition is in a form of a solution, a suspension, an emulsion, a microemulsion, an ointment, a cream, a lotion, a gel, a solid stick, or an aerosol.

Example 29. The treatment composition of any one of examples 25-28 wherein the copper chlorin comprises a sodium salt of the one or more of copper chlorin e6, copper isochlorin e4, copper chlorin p6, copper rhodin g7, or copper chlorophyllin complex.

Example 30. A treatment composition according to any one of examples 18-29 wherein the copper chlorin comprises at least 30% by weight disodium copper isochlorin e4; and wherein the treatment composition further comprises one or more of a chlorin e4; isochlorin e4; copper chlorin e4; copper isochlorin e4; chlorin e6; copper chlorin p6; copper pheophorbide a; copper pyropheophorbide a; copper purpurin 7; copper rhodin g7; copper rhodochlorin; oxidized forms thereof; or salts thereof.

Example 31. A treatment composition according to any one of examples 18-29, wherein the copper chlorin comprises at least 30% by weight disodium copper isochlorin e4; and wherein the treatment composition further comprises at least one additional chlorin compound selected from the group consisting of chlorin e4; isochlorin e4; copper chlorin e4; copper isochlorin e4; chlorin e6; copper chlorin p6; copper pheophorbide a; copper pyropheophorbide a; copper purpurin 7; copper rhodin g7; copper rhodochlorin; oxidized forms thereof; or salts thereof.

Example 32. A method according to any one of Examples 1-16 wherein the treatment composition is one according to any one of Examples 17-31.

As used herein, the terms "treat," "treating," "treatment," and the like refer to eliminating, reducing, or ameliorating a disease or condition, and/or symptoms associated therewith. Although not precluded, treating a disease or condition does not require that the disease, condition, or symptoms associated therewith be completely eliminated.

As used herein, the terms "treat," "treating," "treatment," and the like may include "prophylactic treatment," which refers to reducing the probability of redeveloping a disease or condition, or of a recurrence of a previously-controlled disease or condition, in a subject who does not have, but is at risk of or is susceptible to, redeveloping a disease or condition or a recurrence of the disease or condition. The term "treat" and synonyms contemplate administering a therapeutically effective amount of a composition of the disclosure to an individual in need of such treatment. Within the meaning of the disclosure, "treatment" also includes relapse prophylaxis or phase prophylaxis, as well as the treatment of acute or chronic signs, symptoms and/or malfunctions. The treatment can be orientated symptomatically, for example, to suppress symptoms. It can be affected over a short period, be oriented over a medium term, or can be a long-term treatment, for example within the context of a maintenance therapy.

As used herein, the terms "prevent," "preventing," and "prevention," are art-recognized, and when used in relation to a condition, such AK, is well understood in the art, and includes administration of a composition which reduces the frequency of, or delays the onset of, symptoms of a medical condition in a subject relative to a subject which does not receive the composition. Thus, prevention of AK includes the topical application of a treatment composition herein on areas of skin that would otherwise develop AK if left untreated.

In some cases, the compositions and methods disclosed herein comprise those for treating or preventing AK. In some cases, the compositions and methods disclosed herein comprise those for treating AK. In some cases, the compositions and methods disclosed herein comprise those for preventing AK.

All numerical values, ratios, or percentages indicated herein as a range include each individual amount, numerical value, or ratio within those ranges and any and all subset combinations within ranges, including subsets that overlap from one preferred range to a more preferred range. References to "about" or "around" with respect to numerical values generally mean (1)+/−1 for values expressed as whole numbers (without a decimal, e.g., around 15% means 14-16%); (2)+/−0.1 for values expressed with a single decimal place (for example, around 9.5% means 9.4-9.6%; and (3)+/−0.01 for values expressed with two or more decimal places (for example, around 0.02 means 0.01-0.03, each of the foregoing excluding values that would result in a negative number.

Any treatment composition ingredient, other than a chlorin, described herein as included or optional in any embodiment herein may also be excluded from any embodiment herein. Any method step, other than some form of application of a chlorin, described herein as included or optional in any embodiment herein may also be excluded from any embodiment herein. Unless explicitly excluded herein, any ingredients in any treatment composition embodiment and/or method steps described herein may be used with any other embodiment, even if not specifically described herein with that particular embodiment. Any treatment composition embodiment herein may comprise, consist essentially of, or consist of any combination of ingredients described herein. Any ingredient or method step described in the prior art may also be excluded from compositions and methods according to the disclosure.

References herein to water (without any modifier) include potable water, distilled water, deionized water, or other forms of purified, filtered, or cleaned water suitable for use in topical skin treatment compositions and intradermal treatments. These forms of water may be substituted for references herein to deionized water, other than in the claims.

Those of ordinary skill in the art will also appreciate upon reading this specification, including the examples contained herein, that modifications and alterations to the preferred embodiments of a composition and its method of use may be made within the scope of the invention and it is intended that the scope of the invention disclosed herein be limited only by the broadest interpretation of the appended claims to which the inventor is legally entitled.

We claim:

1. A method of treating actinic keratosis comprising applying a treatment composition to one or more actinic keratosis lesion or lesions, wherein the treatment composition comprises a copper chlorin.

2. The method of claim 1 wherein the applying the treatment composition comprises topically applying a dose of the treatment composition to the one or more actinic keratosis lesion or lesions and wherein the treatment composition is in a liquid form and the dose is around 0.05 to around 1.0 mL.

3. The method of claim 1 wherein the applying the treatment composition comprises topically applying a dose of the treatment composition to the one or more actinic keratosis lesion or lesions and wherein the treatment composition is in a solid or semi-solid form and the dose is around 0.01 to around 2.0 grams.

4. The method of claim 1 wherein the applying the treatment composition comprises topically applying a dose of the treatment composition to the one or more actinic keratosis lesion or lesions and wherein the dose comprises around 25 μg to around 500 μg of the copper chlorin.

5. The method of claim 1 wherein the copper chlorin comprises one or more of copper chlorin e6, copper isochlorin e4, copper chlorin p6, copper rhodin g7, or copper chlorophyllin complex.

6. The method of claim 1 wherein the copper chlorin comprises a sodium salt of one or more of copper chlorin e6, copper isochlorin e4, copper chlorin p6, copper rhodin g7, or copper chlorophyllin complex.

7. The method of claim 1 wherein the treatment composition also comprises one or more sunscreen compounds.

8. The method of claim 1 further comprising:
diagnosing a patient with actinic keratosis prior to applying the treatment composition by:
obtaining a tissue sample from the patient;
determining if the patient has actinic keratosis based on an evaluation of the tissue sample by a medical professional.

9. The method of claim 8 wherein applying the treatment composition is only carried out if the patient is determined to have actinic keratosis, wherein the patient is a human patient, and wherein the medical professional is a medical doctor or a nurse practitioner or a physician assistant.

10. The method of claim 8 wherein applying the treatment composition is only carried out if the patient is determined to have actinic keratosis, wherein the patient is a canine or a feline, and wherein the medical professional is a veterinary doctor or veterinary assistant.

11. The method of claim 1 wherein the copper chlorin comprises copper chlorin e6.

12. The method of claim 1 wherein the copper chlorin comprises a prodrug of a copper chlorin compound.

13. The method of claim 12 wherein the prodrug is a diethyl ester of copper chlorin e6.

14. The method of claim 1 wherein the copper chlorin comprises copper isochlorin e4.

15. The method of claim 1 wherein the copper chlorin comprises copper chlorin p6.

16. The method of claim 1 wherein the copper chlorin comprises copper rhodin g7.

17. The method of claim 1 wherein prior to treatment with the treatment composition, the one or more actinic keratosis lesion or lesions were treated with cryotherapy and were not cleared by the cryotherapy or returned after the cryotherapy.

18. The method of claim 1 wherein photodynamic therapy is not used in the method.

19. The method of claim 9 wherein prior to applying the treatment composition, the patient is positive for one or more HPV types and wherein the copper chlorin comprises sodium copper chlorin e6 or sodium copper rhodin g7 or both.

* * * * *